(12) United States Patent
Kerr et al.

(10) Patent No.: US 10,353,510 B2
(45) Date of Patent: Jul. 16, 2019

(54) FORCE-SCALABLE STATIONARY INTERFACE CONTROL

(71) Applicant: MOTOROLA SOLUTIONS, INC, Chicago, IL (US)

(72) Inventors: Steven J Kerr, Bayan Lepas (MY); Goktug Duman, Oakland Park, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 306 days.

(21) Appl. No.: 15/248,027

(22) Filed: Aug. 26, 2016

(65) Prior Publication Data

US 2018/0059850 A1 Mar. 1, 2018

(51) Int. Cl.
*G06F 3/041* (2006.01)
*G06F 3/0362* (2013.01)
*G06F 3/0484* (2013.01)
*G06F 3/0485* (2013.01)
*G01L 5/22* (2006.01)

(52) U.S. Cl.
CPC ............ *G06F 3/0416* (2013.01); *G01L 5/228* (2013.01); *G06F 3/0362* (2013.01); *G06F 3/0414* (2013.01); *G06F 3/0485* (2013.01); *G06F 3/04847* (2013.01); *G06F 2203/0339* (2013.01); *G06F 2203/04102* (2013.01); *G06F 2203/04104* (2013.01); *G06F 2203/04105* (2013.01)

(58) Field of Classification Search
CPC .... G06F 3/0362; G06F 3/0416; G06F 3/0485; G06F 3/0414
See application file for complete search history.

(56) References Cited

U.S. PATENT DOCUMENTS

| | | | |
|---|---|---|---|
| 6,388,655 B1 | 5/2002 | Leung | |
| 8,796,566 B2 | 8/2014 | Kerner et al. | |
| 9,862,099 B1* | 1/2018 | Linnell | G06F 3/016 |
| 2003/0043174 A1 | 3/2003 | Hinckley et al. | |
| 2010/0126784 A1 | 5/2010 | Suddreth | |

(Continued)

OTHER PUBLICATIONS

International Search Report and Written Opinion, dated Sep. 28, 2017, by ISA/EP, re PCT International Patent Application No. PCT/US2017/046859.

(Continued)

*Primary Examiner* — Abbas I Abdulselam
(74) *Attorney, Agent, or Firm* — Perry + Currier, Inc.

(57) ABSTRACT

A force-scalable stationary interface control is provided. The control includes a knob-like structure including an axis and a fixed surface located at least partially around the axis, and a touch sensor located at least partially around the fixed surface, the touch sensor configured to sense a plurality of different levels of applied pressure and locations of touch input. The control further includes at least one output device. The control further includes a controller configured to: identify a first level of applied pressure sensed at the touch sensor, identify a scrolling action based on a detected change in locations of the touch input sensed at the touch sensor, identify a current scale of the scrolling action based on an identified first level of applied pressure, and control the at least one output device to provide an identified current scale and an identified scrolling action.

18 Claims, 17 Drawing Sheets

(56) References Cited

U.S. PATENT DOCUMENTS

| | | |
|---|---|---|
| 2013/0292481 A1 | 11/2013 | Filson et al. |
| 2014/0042002 A1* | 2/2014 | Chu .................. H03K 17/9622 |
| | | 200/313 |
| 2014/0143737 A1 | 5/2014 | Mistry et al. |
| 2014/0267039 A1 | 9/2014 | Curtis |
| 2014/0319232 A1 | 10/2014 | Gourlay et al. |
| 2015/0071652 A1 | 3/2015 | Zhuge et al. |
| 2015/0355714 A1 | 12/2015 | Colgate et al. |
| 2016/0187975 A1* | 6/2016 | Drescher ................. G06F 3/016 |
| | | 345/174 |
| 2016/0269540 A1* | 9/2016 | Butcher ............ H04M 1/72569 |
| 2017/0255269 A1* | 9/2017 | Yang ....................... G06F 3/016 |
| 2018/0217682 A1* | 8/2018 | Dangy Caye .......... G04G 21/08 |

OTHER PUBLICATIONS

Russell, "Major Touch ID Enhancements Coming, Apple Patent Suggest," article (Dec. 18, 2014) p. 1-4, http://www.technobuffalo.com/2014/12/18/major-touch-id-enhancements-coming-apple-patents-suggest/.

Mayhew Labs, "Touch Sensitive Rotary Encoder Breakout," user guide (2010) pp. 1-2.

Clark "Preh Teams up with Audi on new TT's high-tech air vents" news article (May 1, 2015) 2 pages, Automotive News, http://europe.autonews.com/article/20150501/CUTAWAY01/150439984/preh-teams-up-with-audi-on-new-tts-high-tech-air-vents.

* cited by examiner

700

- IDENTIFY A FIRST LEVEL OF APPLIED PRESSURE SENSED AT THE TOUCH SENSOR —701
- IDENTIFY A SCROLLING ACTION BASED ON A DETECTED CHANGE IN LOCATIONS OF THE TOUCH INPUT SENSED AT THE TOUCH SENSOR —703
- IDENTIFY A CURRENT SCALE OF THE SCROLLING ACTION BASED ON AN IDENTIFIED FIRST LEVEL OF APPLIED PRESSURE —705
- CONTROL THE AT LEAST ONE OUTPUT DEVICE TO PROVIDE AN IDENTIFIED CURRENT SCALE AND AN IDENTIFIED SCROLLING ACTION —707

*FIG. 7*

| THRESHOLD VALUES/RULES | SCALE VALUES |
| --- | --- |
| <=P1 | 1 |
| >P1 AND <=P2 | 10 |
| >P2 | 100 |

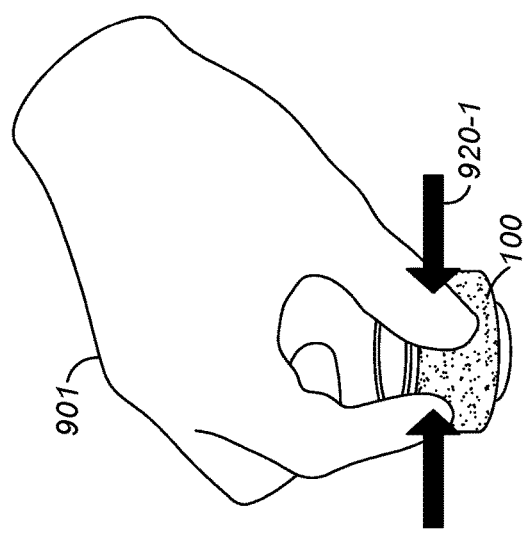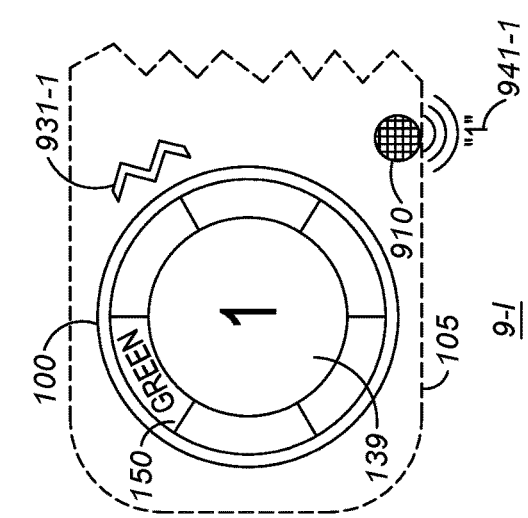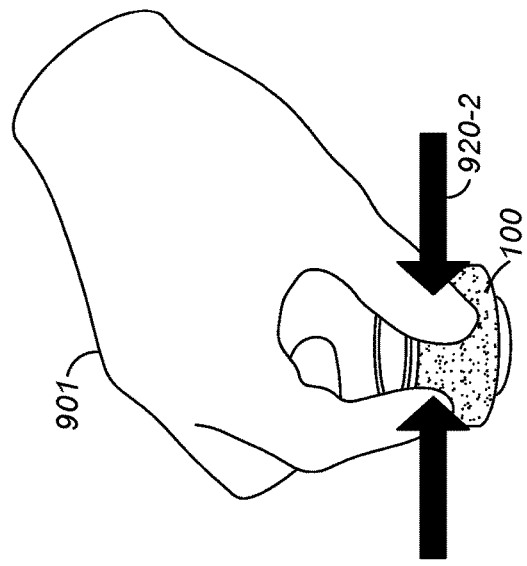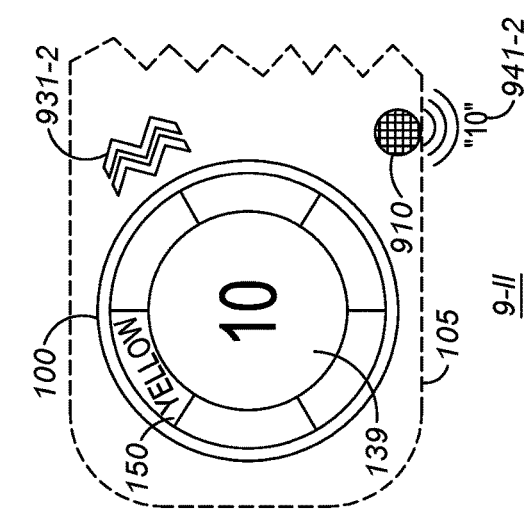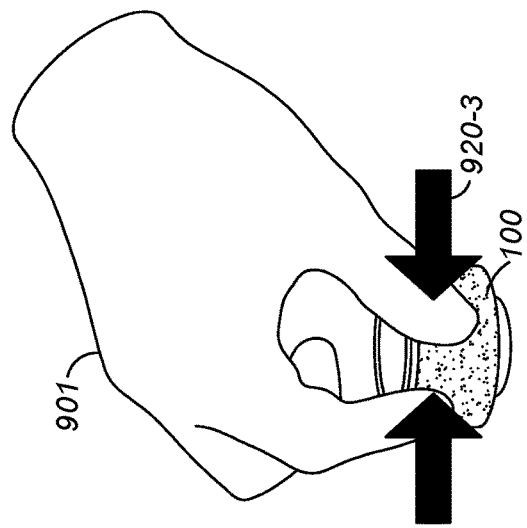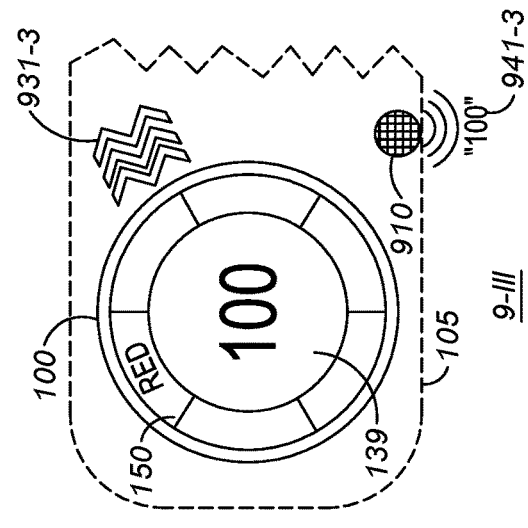
FIG. 9

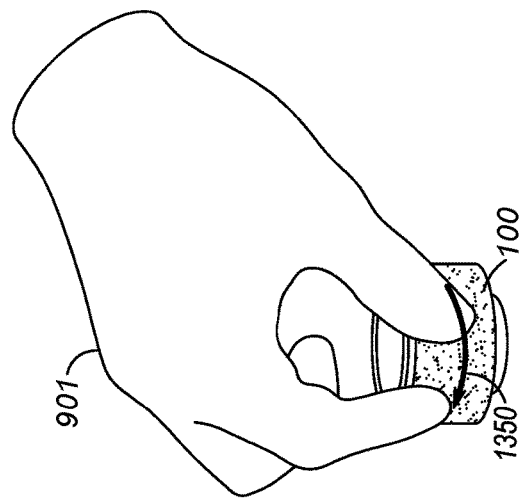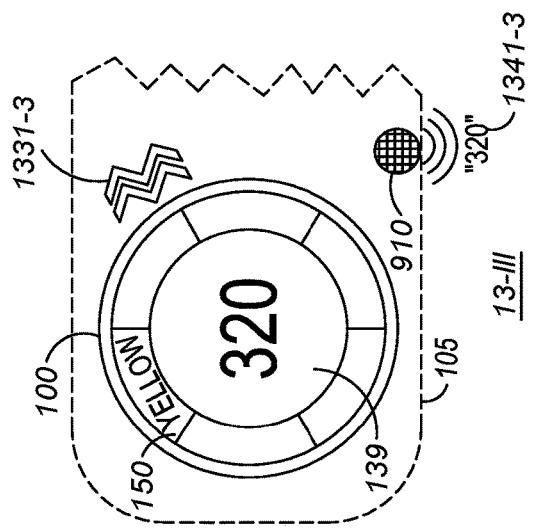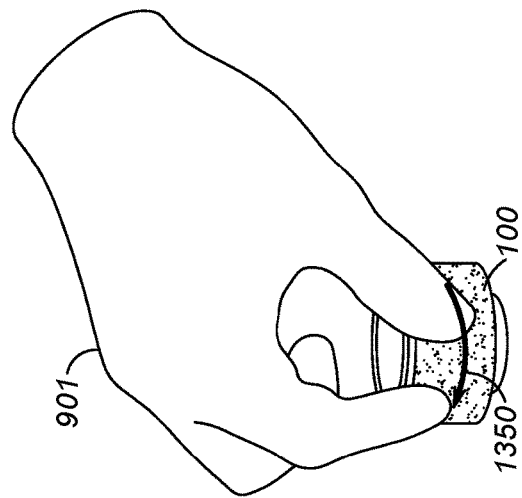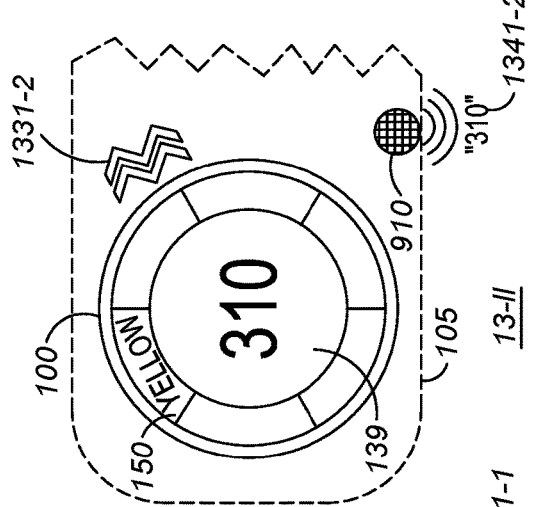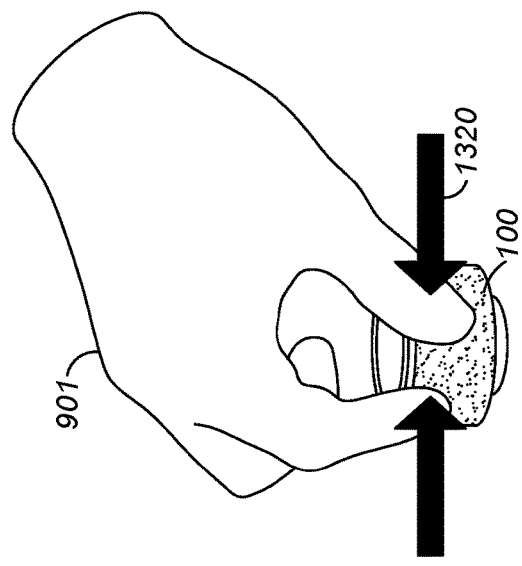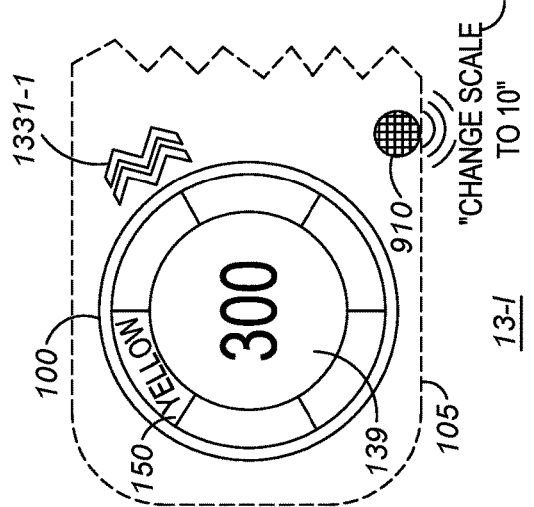
FIG. 13

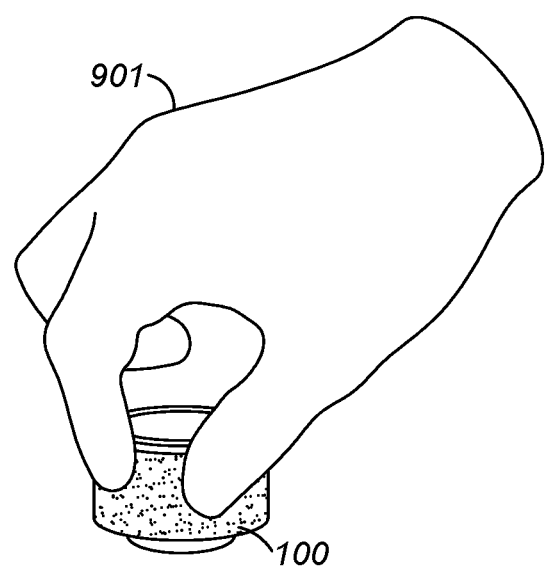
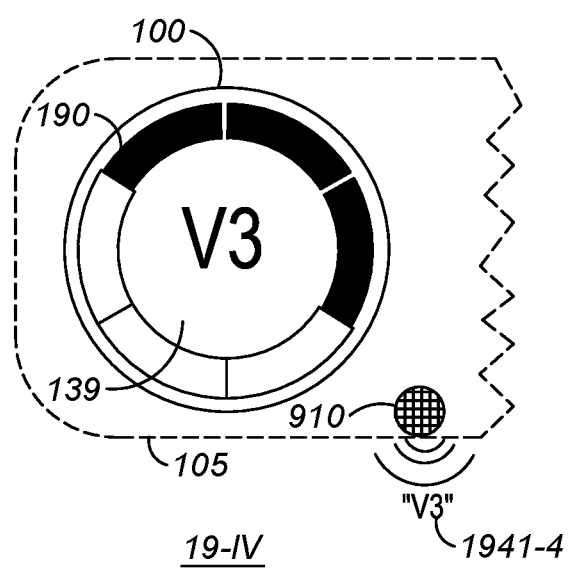
FIG. 20

FORCE-SCALABLE STATIONARY INTERFACE CONTROL

BACKGROUND OF THE INVENTION

Physical knobs on portable and mobile radios may be limited as to a number of modes with which they may be used. Furthermore, when using a physical knob to select values from a list of values, it may be difficult to quickly select a single value from a large number of values and/or select a single item from a long list of items, especially when trying to perform such a selection without visual reference. For example, at a portable or a mobile radio, when the radio is currently on channel 1 and a physical knob is to be used to scroll to channel 322, such scrolling may be time consuming. Similarly, when a physical knob is used to scroll through a series of embedded folders to find a file of interest, to find a single value from a long list, a long structured list, or an alphabetical list, such scrolling may be time consuming. Each of these situations is exacerbated when such scrolling occurs without visual reference, for example, when scrolling results are not viewable on the physical knob, and/or a display device. For example, such situations may occur when an emergency responder is using a radio in a situation where looking at the radio may be challenging, such as in a smoke-filled room and/or when the emergency responder is wearing protective face gear or protective breathing gear.

Accordingly, there is a need for a force-scalable stationary interface control.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 7 is a block diagram of a flowchart of a method for controlling the force-scalable stationary interface control of FIG. 6, according to non-limiting embodiments.

FIG. 8 depicts scale data stored at a memory of the force-scalable stationary interface control of FIG. 6, according to non-limiting embodiments.

FIG. 9 is a sequence of views of an interaction with the knob-like structure of FIG. 1, according to non-limiting embodiments.

FIG. 13 is a sequence of views of another interaction with the knob-like structure of FIG. 1, which may follow from the sequence of FIG. 11, according to non-limiting embodiments.

FIG. 20 is another view of the sequence of FIG. 19, according to non-limiting embodiments.

Figure 1:
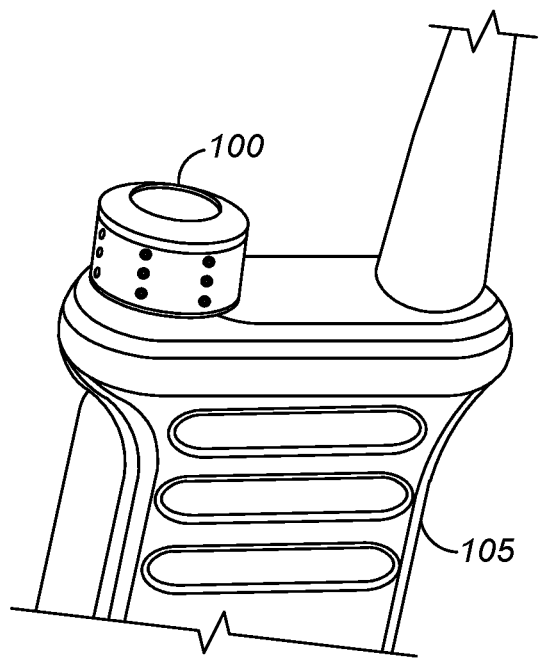
FIG. 1 is a perspective view of a knob-like structure in context with a portable radio, according to non-limiting embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a force-scalable stationary interface control comprising: a knob-like structure including an axis and a fixed surface located at least partially around the axis; a touch sensor located at least partially around the fixed surface, the touch sensor configured to sense a plurality of different levels of applied pressure and locations of touch input; at least one output device; and a controller coupled to the touch sensor and the at least one output device, the controller configured to: identify a first level of applied pressure sensed at the touch sensor, identify a scrolling action based on a detected change in locations of the touch input sensed at the touch sensor, identify a current scale of the scrolling action based on an identified first level of applied pressure, and control the at least one output device to provide an identified current scale and an identified scrolling action.

The touch sensor may comprise: a first sensor configured to sense the plurality of different levels of applied pressure; and a second sensor configured to sense the locations of the touch input.

The controller may be further configured to increase the identified current scale as a level of applied pressure, sensed at the touch sensor, increases.

The controller may be further configured to increase the identified current scale by one or more orders of magnitude as a level of applied pressure, sensed at the touch sensor, exceeds one or more respective threshold values.

The controller may be further configured to: identify the current scale as a first identified scale level when the identified first level of applied pressure is below a threshold value; and identify the current scale as a second identified scale level when the identified first level of applied pressure is above the threshold value.

The controller may be further configured to: identify the current scale based on the identified first level of applied pressure sensed at the touch sensor, and control the at least one output device to provide the identified current scale; and after the identified current scale is determined, control the at least one output device to provide the identified scrolling action based on the identified current scale and the detected change of the locations of the touch input.

The controller may be further configured to identify the current scale based on the identified first level of applied pressure sensed during sensing of the detected change in the locations of the touch input at the touch sensor.

The scrolling action may include scrolling through one or more of: items in a list stored at a memory accessible to the controller; and, channels of a radio to which the knob-like structure is attachable.

The controller may be further configured to control the at least one output device to provide the identified scrolling action after identifying the current scale and when the detected change in the locations of the touch input are sensed at the touch sensor.

The controller may be further configured to identify the current scale and control the at least one output device to provide the identified current scale and the identified scrolling action when the first level of applied pressure is sensed at two or more positions around the fixed surface.

The at least one output device may be located one or more of at the knob-like structure and in a radio device to which the knob-like structure is attachable, the at least one output device including one or more of: a display device, a speaker, and a haptic device.

Another aspect of the specification provides a method comprising: identifying, at a controller, a first level of applied pressure sensed at a touch sensor, the touch sensor located at least partially around a fixed surface of a knob-like structure, the knob-like structure including an axis, the fixed surface located at least partially around the axis, the touch sensor configured to sense a plurality of different levels of applied pressure and locations of touch input, the controller coupled to the touch sensor and at least one output device; identifying, at the controller, a scrolling action based on a detected change in the locations of the touch input sensed at the touch sensor; identifying, at the controller, a current scale of the scrolling action based on an identified first level of applied pressure sensed at the touch sensor; and controlling, at the controller, the at least one output device to provide an identified current scale and an identified scrolling action.

The method may further comprise increasing the identified current scale as a level of applied pressure, sensed at the touch sensor, increases.

The method may further comprise increasing the identified current scale by one or more orders of magnitude as a level of applied pressure, sensed at the touch sensor, exceeds one or more respective threshold values.

The method may further comprise: identifying the current scale as a first identified scale level when the identified first level of applied pressure is below a threshold value; and identifying the current scale as a second identified scale level when the identified first level of applied pressure is above the threshold value.

The method may further comprise: identifying the current scale based on the identified first level of applied pressure sensed at the touch sensor, and controlling the at least one output device to provide the identified current scale; and after the identified current scale is determined, controlling the at least one output device to provide the identified scrolling action based on the identified current scale and the detected change of the locations of the touch input.

The method may further comprise determining the current scale based on the identified first level of applied pressure sensed during sensing of the detected change in the locations of the touch input at the touch sensor.

The scrolling action may include scrolling through one or more of: items in a list stored at a memory accessible to the controller; and, channels of a radio to which the knob-like structure is attachable.

The method may further comprise controlling the at least one output device to provide the identified scrolling action after identifying the current scale and when the detected change in the locations of the touch input are sensed at the touch sensor.

The method may further comprise identifying the current scale and controlling the at least one output device to provide the identified current scale and the identified scrolling action when the first level of applied pressure is sensed at two or more positions around the fixed surface.

FIG. 1 depicts an example electrical device that includes a force-scalable stationary interface control. In the example shown in FIG. 1, the electrical device as depicted in FIG. 1 may include a portable radio device 105 and the force-scalable stationary interface control includes a knob-like structure 100. The force-scalable stationary interface control is not limited to inclusion with portable radio device 105 in FIG. 1, but may be used with other electrical devices such as other radios, telephones, mobile devices, portable devices, stereo systems, vehicles, amplifiers, power tools, large appliances, small appliances, vehicles, and the like. The force-scalable stationary interface control may be used with electrical devices that require selection of items, channels, values and the like using a scrolling action.

Figure 2:
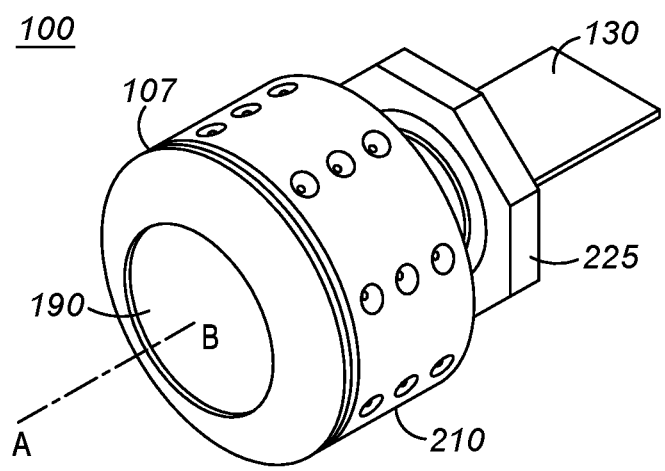
FIG. 2 is an isometric view of the knob-like structure of FIG. 1, according to non-limiting embodiments.
Figure 3:
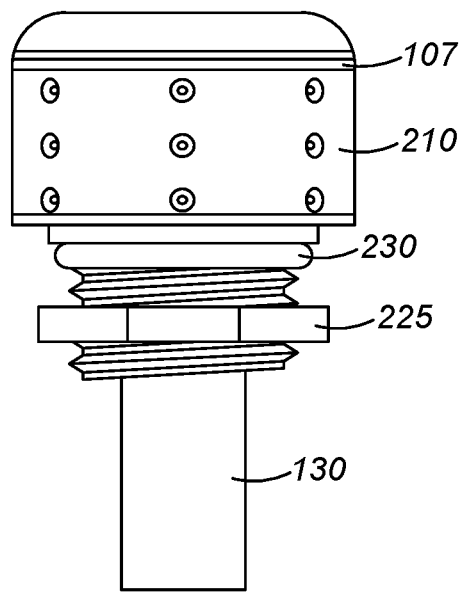
FIG. 3 is a side view of the knob-like structure of FIG. 1, according to non-limiting embodiments.
Figure 4:
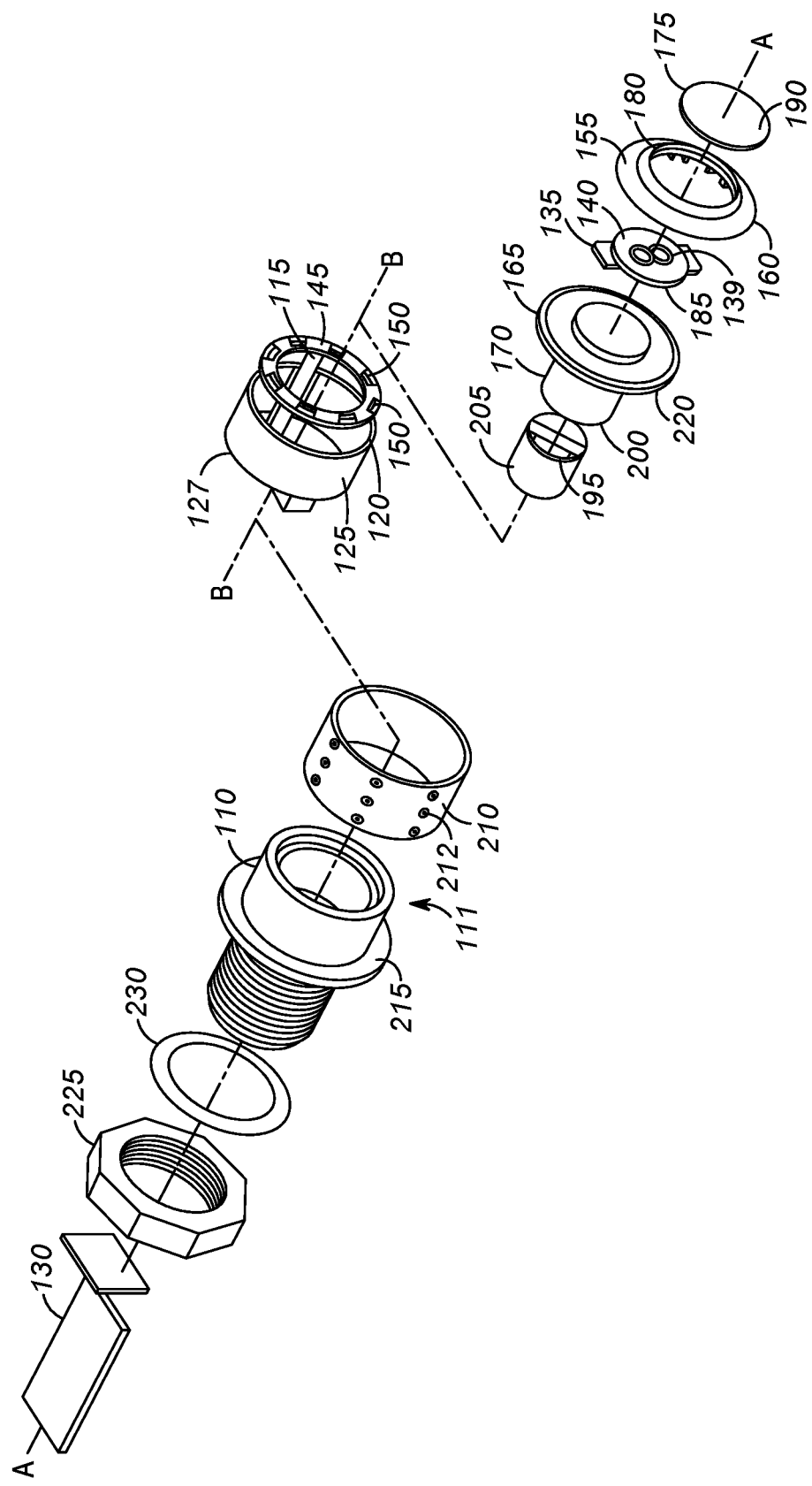
FIG. 4 is an exploded view of the knob-like structure of FIG. 1, according to non-limiting embodiments.

An isometric view and a side view of knob-like structure 100, as depicted in FIGS. 2 and 3, includes a body 107, an interface connector 130, a surface 190, a touch sleeve 210, a collar nut 225, and an O-ring 230, with each of the components of FIGS. 2 and 3 being described in more detail below with reference to FIG. 4. In an exploded view of knob-like structure 100, as shown in FIG. 4, body 107 includes a fixed surface 110 of a main base 111. Main base 111 and other components of body 107 may be made of plastic resin, although it should be noted that these components may also be made of other materials. In an embodiment, knob-like structure 100 includes an axis A and fixed surface 110 is located at least partially around axis A, at least when knob-like structure 100 is assembled. Body 107 may be non-unitary and include other components (such as a front cap 155, a front cap base 170, and touch sleeve 210, discussed in more details below).

As depicted, knob-like structure 100 and/or body 107 are each generally cylindrical, such that a cross-section thereof is circular, however other shapes are within the scope of present embodiments. For example, a cross-section thereof may be oval, elliptical, polygonal, and the like. Furthermore, knob-like structure 100 and/or body 107 may further comprise a partial cylinder, and the like, such that a cross-section thereof may include a semi-circle and/or a partial circle, and the like. In yet further embodiments, knob-like structure 100 and/or body 107 may comprise a hemispherical shape. Indeed, it should now be apparent that various shapes of knob-like structure 100 and/or body 107 are within the scope of present embodiments. Furthermore, while other components of knob-like structure 100 are also described below as being cylindrical, it is appreciated that such components may be adapted to a general shape of knob-like structure 100.

As depicted, knob-like structure 100 includes a flexible printed circuit (FPC) 115 having a cylindrical shape that is disposed at least partially around fixed surface 110. Flexible printed circuit 115 includes a flexible printed circuit board 120 and a touch sensor 125. At least when knob-like structure 100 is assembled, touch sensor 125 is located at least partially around fixed surface 110 (hence also at least partially around axis A). As will be described below, touch sensor 125 is generally configured to sense a plurality of different levels of applied pressure and locations of touch input.

Hence, touch sensor 125 includes force-sensitive and/or pressure-sensitive touch technology, for example, for multiple point detection of an interaction with the knob-like structure 100 that includes detection of applied pressure and/or applied force, as discussed further herein.

While each of flexible printed circuit 115 and touch sensor 125 may be flexible, in other embodiments, printed circuits and/or touch sensors may be used that are not flexible and/or are only partially flexible, and shaped similarly to knob-like structure 100 and/or body 107 and/or fixed surface 110.

Moreover, while one touch sensor 125 is shown in FIG. 4 substantially forming a cylinder, it is envisioned that a plurality of touch sensors may be used together to substantially form the cylinder. Touch sensor 125, and more specifically a surface 127 of touch sensor 125, has an axis B which, when knob-like structure is assembled, is coincident with axis A, as described in further detail below.

Flexible printed circuit 115 includes a first electrical connection to interface connector 130, a second electrical connection to a flexible printed circuit 135 for a front display 139 and a touch panel 140, and a third electrical connection to a flexible printed circuit 145 that supports light emitting diodes (LEDs) 150. As depicted, front display 139 comprises a display configured to provide and/or render numerical digits to visually represent the numerical digits, for example numbers from 1 to 999; however, as depicted in FIG. 4, front display 139 is showing only one number (e.g. "8"). In other embodiments, front display 139 may comprise a display configured to provide and/or render a plurality of images, alphanumeric characters, and the like to visually represent the plurality of images, alphanumeric characters, and the like. Front display 139 may include, but is not limited to, one or more of a 7-segment display, a light emitting diode display, a liquid crystal display (LCD), an organic light emitting diode (OLED) display, a thin film-electroluminescent (TFEL) display, and the like.

Light emitting diodes 150 are appreciated to be optional; however, when present, light emitting diodes 150 may render and/or provide visual information and/or visual information (e.g., through a color ring) indicative of an action and/or a scrolling action at knob-like structure 100 and/or radio device 105. Furthermore, each individual light emitting diode 150 may be individually controllable, such that a portion of light emitting diodes 150 may be turned on, while another portion of light emitting diodes 150 may remain off.

In some embodiments, light emitting diodes 150 are configured to emit a plurality of colors. Indeed, in some of these embodiments, each individual light emitting diode 150 may be individually controllable, such that a portion of light emitting diodes 150 may be controlled to emit a first color, while another portion of light emitting diodes 150 may be controlled to emit a second color different from the first color.

In yet further embodiments, other optional visual sources (e.g., incandescent lights, a liquid crystal display element, and the like) may be used in place of optional light emitting diodes 150.

A front cap 155 may be made of a translucent plastic resin, and the like, and may have a predefined color. Front cap 155 includes an edge 160 that resides next a shelf 165 of front cap base 170. Front cap 155 may be molded to give an effect, such as to indicate when knob-like structure 100 and/or radio device 105 is switched from a first mode (e.g. a volume mode) to a second mode (e.g., a channel mode), or vice versa.

Glass lens 175 may be fastened to a shelf 180 of front cap 155 with an adhesive, and the like. Flexible printed circuit 135 for front display 139 and touch panel 140 may be fastened to front cap base 170 with an adhesive, for example. Front display 139 and touch panel 140 includes a touch panel sensor 185 which may be flexible and made of a similar design as touch sensor 125 and is about parallel to a surface 190 of glass lens 175.

A haptic device 195 (including, but not limited to, a haptic vibrator) may optionally be disposed in a pocket 200 of the front cap base 170. A rubber bumper 205 may be disposed between haptic device 195 and front cap base 170 and couple the elements through the use of an adhesive, and the like. In place of haptic device 195 and/or in addition to haptic device 195, knob-like structure 100 may include a speaker, and the like.

A touch sleeve 210 may be made of a plastic resin and have a surface 212 with patterns defined to enhance a feel of an interaction with knob-like structure 100. Example patterns include, but are not limited to, micro dots, dimples, serrations, and the like. The patterns provide tactile feedback of a touch-based interaction with knob-like structure 100. Touch sleeve 210 may be sleeved over fixed surface 110 of main base 111 before assembling front cap base 170, however, when assembled, touch sensor 125 resides between touch sleeve 210 and fixed surface 110. Touch sleeve 210, and more specifically surface 212, includes axis A, and is held in place by shelves 215 and 220. Axis A coincides with axis B of touch sensor 125, at least when knob-like structure 100 is assembled.

Further, touch sleeve 210 is shown as being cylindrical, however it is envisioned that the sleeve may be non-cylindrical, e.g., have ridges or edges, for more tactile feel, or even more complex shapes, such as including a partially spherical shape. In particular, at least fixed surface 110, touch sensor 125 and touch sleeve 210 are similarly shaped and/or are adapted to a shape of knob-like structure 100.

As depicted, main base 111 may include a D-slot for ease of assembly to an electrical device, e.g., portable radio device 105. A collar nut 225 and an O-ring 230 provide a fastener for fastening the knob-like structure 100 to the electrical device. The sealing interfaces using an adhesive, above, may alternatively be sealed through ultrasonic welding or a combination of adhesive and ultrasonic welding.

One method of assembling knob-like structure 100 may include assembling a first subassembly by combining glass lens 175 to front cap 155, and a second subassembly of flexible printed circuit 115 and flexible printed circuit 135 to front cap base 170. Next, the first subassembly may be fastened to the second subassembly, resulting in a third subassembly. The first subassembly and the second subassembly may be fastened by an ultrasonic welding process, for example. Next, haptic device 195 (and/or a speaker) and rubber bumper 205 may be fastened (e.g. adhered) to the third subassembly, resulting in a fourth subassembly. Flexible printed circuit 115 may then be fastened to main base 111. Optionally, flexible printed circuit 115 may include a board-to-board connection to enable assembly of flexible printed circuits 115, 135, 145 to interface connector 130 to one another. Touch sleeve 210 may be sleeved over fixed surface 110 before ultrasonic welding the front cap base 170 to main base 111, thereby resulting in a fifth subassembly. The fifth subassembly may then be assembled with O-ring 230. Collar nut 225 may then be used to secure the knob-like structure 100 to the electrical device, for example radio device 105.

When assembled, electrical components of knob-like structure 100 are coupled to interface connector 130 such that output from electrical components of knob-like structure 100 may be conveyed out of knob-like structure 100, and further electrical components of knob-like structure 100 may be controlled by receiving control data and/or signals from electrical components external to knob-like structure 100.

However, it should be emphasized that the structure of knob-like structure 100 in FIG. 1, FIG. 2, FIG. 3, and FIG. 4 is purely an example, and other structures of knob-like structure 100 are within the scope of present embodiments. Indeed, knob-like structure 100 may be provided in any form that includes an axis and a fixed surface located at least partially around the axis, and in which a touch sensor is located at least partially around the fixed surface, the touch sensor configured to sense a plurality of different levels of applied pressure and locations of touch input.

Figure 5:
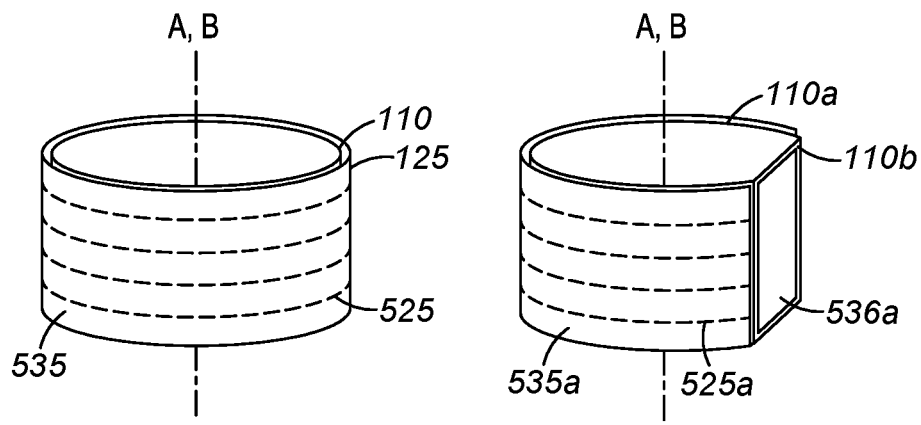
FIG. 5 is a simplified schematic diagram of a touch sensor in relation to a fixed surface of a main base of the knob-like structure of FIG. 1, according to two non-limiting embodiments.

Attention is next directed to FIG. 5 which depicts a simplified schematic diagram of touch sensor 125 in relation to fixed surface 110 of main base 111 when knob-like structure 100 is assembled. In particular, axes A, B are aligned, and further more fixed surface 110 is located at least partially around axis A (and/or axis B). Similarly, touch sensor 125 is located at least partially around fixed surface 110, and hence touch sensor 125 is also located at least partially around axis A (and/or axis B).

Touch sensor 125 is generally configured to sense a plurality of different levels of applied pressure and locations of touch input. Hence, touch sensor 125 may comprise one or more of a capacitive touch sensor and a resistive touch sensor. Capacitive touch sensors sense touch by sensing conducting materials performing the touching; hence, touch sensor 125 may comprise one or more capacitive touch sensors when knob-like structure 100 is to be used with bare fingers and/or bare body parts, and/or with a conducting stylus and the like. Use of capacitive touch sensors further assumes that either touch sleeve 210 is not included in knob-like structure or that touch sleeve 210 is adapted for use with capacitive touch sensors.

However, when touch sensor 125 is to be used with touch sleeve 210 (assuming touch sleeve 210 is non-conductive) and/or gloved body parts and/or covered body parts, and the like, non-conducting styluses, and the like, and/or any non-conducting materials, touch sensor 125 may comprise one or more resistive touch sensors, which do not rely on conducting materials performing the touching.

It is further appreciated that touch sensor 125 is adapted to sense a plurality of different levels of applied pressure and/or applied force. Hence, touch sensor 125 may include one or more piezoelectric touch sensors, and the like, and/or one or more piezoelectric materials, and the like, as piezoelectric materials produce a voltage at least partially proportional to a pressure and/or force applied thereto. For example, a capacitive touch sensor and/or a resistive touch sensor of touch sensor 125 may be adapted to include a piezoelectric touch sensor, and the like, and/or piezoelectric materials. In such embodiments, such capacitive touch sensors and/or resistive touch sensors may be provided as a single unit and integrated into touch sensor 125. Hence, data and/or signals output from touch sensor 125 may be indicative of both a level of applied pressure of touch input and one or more locations of the touch input.

Output from touch sensor 125, that indicates a detected level of applied pressure, may be in absolute units (e.g. metric and/or imperial units of pressure or force), arbitrary units, relative units, and/or digital units (for example on a scale of 0 to 255, with an output of 0 corresponding to no applied pressure being sensed, and an output of 255 corresponding to sensing of an applied pressure that is at a maximum applied pressure detectable by touch sensor 125).

Touch sensor 125 may be coupled to interface connector 130 such that output from touch sensor 125 may be conveyed to electrical components external to knob-like structure 100.

As described above, one or more piezoelectric touch sensors may be added to an existing capacitive touch sensor and/or a resistive touch sensor of touch sensor 125.

In either case, with further reference to FIG. 5, touch sensor 125 may comprise: a first sensor 525 configured to sense the plurality of different levels of applied pressure; and a second sensor 535 configured to sense the locations of the touch input. In FIG. 5, first sensor 525 is depicted as broken lines around touch sensor 125, and second sensor 535 includes at least the areas between the broken lines. However, such a depiction is understood to be schematic and each of first sensor 525 and second sensor 535 may be integrated with each other and/or disposed separately at least partially around axis A.

Furthermore, while present embodiments are described with respect to capacitive touch sensors, resistive touch sensors and piezoelectric touch sensors, other types of sensors which may detect a plurality of different levels of applied pressure and locations of touch input which may include, but are not limited to, optical sensors, surface acoustic wave sensors, and the like.

As depicted, a cross-section of each of fixed surface 110 and touch sensor 125 comprises a circle around axis A, and hence, touch sensor 125 provides a touch surface 360° around axis A. However, in other embodiments, fixed surface 110 does not extend 360° around axis A, and/or touch sensor 125 does not extend all the way around fixed surface 110. For example fixed surface 110 may extend about only partially around axis A, and/or touch sensor 125 may extend only partially around fixed surface 110. For example, fixed surface 110 and/or touch sensor 125 may each extend between 180° and 360° around axis A, with a shape of knob-like structure 100 adapted accordingly, such that knob-like structure 100 may be "squeezed" at two positions, as described below.

Indeed, a configuration of fixed surface 110 and touch sensor 125 with respect to axis A may depend on functionality and/or shape of knob-like structure 100. For example, FIG. 5 also depicts an alternative embodiment of a fixed surface 110a and a touch sensor 125a which may be integrated into knob-like structure 100 in place of cylindrical fixed surface 110 and touch sensor 125, with other components of knob-like structure 100 adapted accordingly. Each of fixed surface 110a and touch sensor 125a are respectively similar to fixed surface 110 and touch sensor 125. Touch sensor 125a comprises a first sensor 525a and a second sensor 535a, each respectively similar to first sensor 525 and second sensor 535.

However, in contrast to fixed surface 110 and touch sensor 125, each of fixed surface 110a and touch sensor 125a extends only partially around axes A, B with a flat fixed surface 110b joining ends of otherwise cylindrical fixed surface 110a.

As depicted, an optional touch panel 536a may be located at flat fixed surface 110b, and optional touch panel 536a may be similar to touch panel 140, and also coupled to interface connector 130. Optional touch panel 536a may receive touch input to control modes at radio device 105, and the like, that are different from modes controllable using touch sensor 125 and/or touch panel 140. Furthermore, optional touch panel 536a may be used in conjunction with other touch sensors of knob-like structure 100, as described in further detail below.

Operation of knob-like structure 100 generally occurs via pressure being applied to touch sensor 125, for example through touch sleeve 210, and a scale of a scrolling action to be performed using knob-like structure 100 is identified at least on the basis of a first level of applied pressure sensed at touch sensor 125. For example an applied pressure may be received at one or more locations of touch sleeve 210 that include touch sensor 125, and touch sensor 125 may sense a level of the applied pressure. A first level of applied pressure may be determined when applied pressure is initially sensed at touch sensor 125 for one or more of a given time period and in a given sequence. In other implementations, a scale of a scrolling action to be performed using knob-like structure 100 may be identified on the basis of a level of applied pressure sensed at touch sensor 125 that is received during a scrolling action and/or after a first level of applied pressure is received. Indeed, as will be described in more detail below, a scale of a scrolling action may be determined and/or changed each time a level of applied pressure senses at touch sensor 125 meets threshold conditions, which may include, a level of applied pressure being above a threshold value (e.g. for a given time period) and/or a level of applied pressure being received in a given sequence. The pressure may be applied using the one or more fingers, which may be gloved or not gloved, one or more styluses and/or any similar device. In particular embodiments, applied pressure may be received at two or more locations of knob-like structure 100 that include touch sensor 125 due to a squeezing action at touch sleeve 210, and, in response, controller 620 identifies a current scale of a scrolling action. In addition, touch sensor 125 senses when locations of touch input change, for example when one more fingers and the like, move along the surface of touch sleeve 210; in response, controller 620 identifies a scrolling action.

As will also be described in further detail below, at least one output device is controlled to provide an identified current scale. For example haptic device 195 may be controlled to provide haptic feedback at knob-like structure 100 to indicate an identified current scale. Alternatively, a speaker, and the like, at knob-like structure 100 and/or radio device 105 may be controlled to audibly emit the identified current scale. Alternatively, a display device (such as front display 139 and/or light emitting diodes 150) at knob-like structure 100, and/or a display device at radio device 105, may be controlled to indicate the identified current scale. Furthermore, as the applied pressure changes, for example, increases or decreases, the at least one output device may be controlled to indicate an identified current scale and/or a current scale as it changes due to changes in the applied pressure. For example, as the applied pressure increases, the identified current scale may increase; and, as the applied pressure decreases, the identified current scale may decrease. Identification of a current scale may be threshold based, as described in further detail below.

Furthermore, the scrolling action may be identified based on a detected change in locations of touch input sensed at touch sensor 125, and the at least one output device is controlled to provide the scrolling action. For example, one or more fingers (gloved or not gloved), one or more styluses, and the like, may move around the surface of touch sensor 125 (and/or touch sleeve 210) and as touch sensor 125 senses changes in locations of touch input, the scrolling action is implemented. Furthermore, the at least one output device is controlled to indicate the scrolling action. Identification of the identified current scale and the identified scrolling action may occur in a sequence or concurrently; similarly, the at least one output device may be controlled to provide the identified current scale and the identified scrolling action in in a sequence or concurrently. Operation of force-scalable stationary interface controls is described in further detail hereafter.

Figure 6:
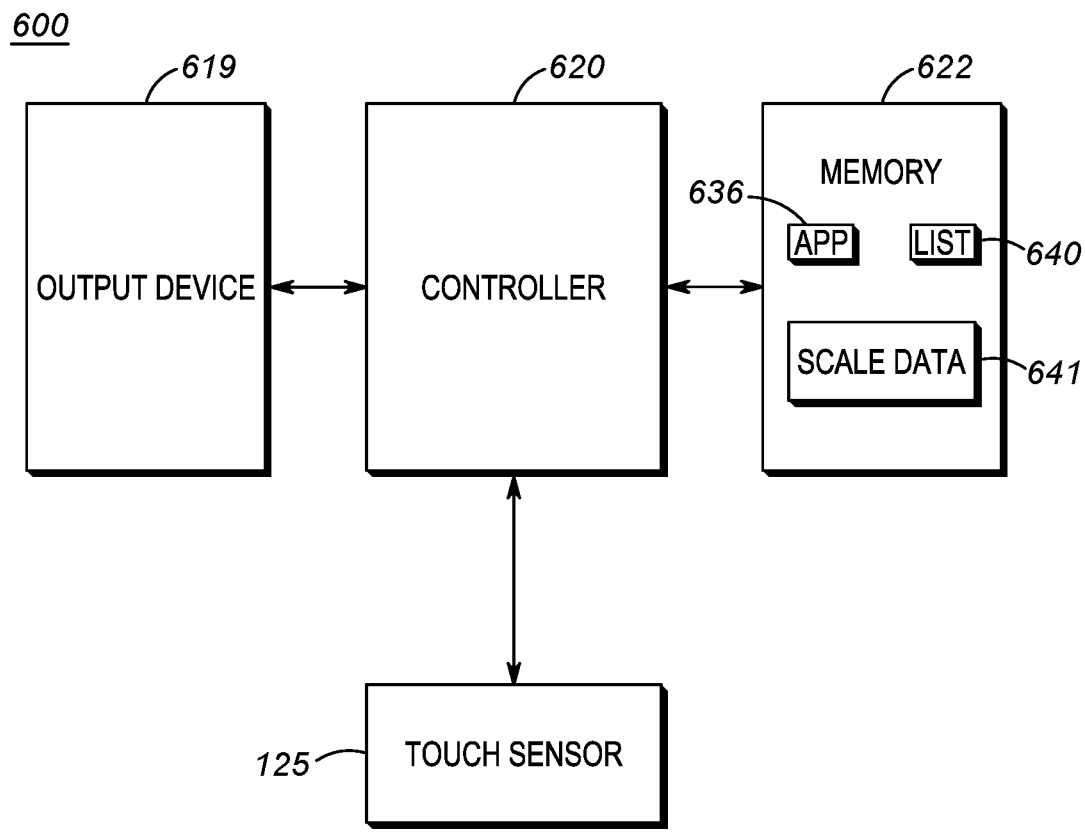
FIG. 6 is a schematic diagram of components of a force-scalable stationary interface control that includes the knob-like structure of FIG. 1, according to non-limiting embodiments.

Attention is next directed to FIG. 6 which depicts a schematic diagram of components of a force-scalable stationary interface control 600, which may include knob-like structure 100. In particular, force-scalable stationary interface control 600 comprises touch sensor 125, at least one output device 619, a controller 620 coupled to touch sensor 125 and at least one output device 619, and, optionally, a memory 622 accessible to controller 620. It should be emphasized that the structure of force-scalable stationary interface control 600 in FIG. 6 is purely an example, and force-scalable stationary interface control 600 may be provided in any format that includes at least a controller, a touch sensor and at least one output device.

Force-scalable stationary interface control 600 comprises controller 620 which may include any suitable combination of processors and/or a plurality of processors, including but not limited to one or more central processors (CPUs) and/or one or more processing units; either way, controller 620 comprises a hardware element and/or a hardware processor. Indeed, in some embodiments, controller 620 may comprise an application-specific integrated circuit (ASIC) and/or a field-programmable gate array (FPGA) specifically configured to implement the functionality of force-scalable stationary interface control 600. Hence, force-scalable stationary interface control 600 and/or controller 620, is not necessarily a generic computing device and/or a generic processor and/or a generic component, but a device configured to implement specific functionality and in particular identify a current scale of a scrolling action and control at least one output device 619 to provide an identified current scale and an identified scrolling action. For example, controller 620 may specifically comprise an engine configured to identify a current scale of a scrolling action and control at least one output device 619 to provide an identified current scale and an identified scrolling action.

Memory 622, when present, may comprise a non-volatile storage unit (e.g. Erasable Electronic Programmable Read Only Memory (EEPROM), Flash Memory, and the like) and a volatile storage unit (e.g. random access memory (RAM), and the like). Programming instructions that implement the functional teachings of controller 620 as described herein are typically maintained, persistently, in memory 622 and used by controller 620 which makes appropriate utilization of volatile storage during the execution of such programming instructions. Those skilled in the art recognize that memory 622 is an example of computer readable media that may store programming instructions executable at controller 620. Furthermore, memory 622 is also an example of a memory unit and/or memory module and/or a non-volatile memory.

In particular, memory 622 may store an application 636 (labeled as "App" in FIG. 6), which, when processed by controller 620, enables controller 620 to: identify a first level of applied pressure sensed at touch sensor 125, identify a scrolling action based on a detected change in locations of the touch input sensed at touch sensor 125, identify a current scale of the scrolling action based on an identified first level of applied pressure, and control at least one output device 619 to provide an identified current scale and an identified scrolling action.

As depicted, memory 622 further stores a list 640 comprising items and/or values and/or data sets to which a scrolling action is to be applied. For example, in particular embodiments, list 640 may comprise a list of channels that may be used by radio device 105 to communicate; in these embodiments, list 640 may comprise a list of channels numbered, for example, from 1 to 500, assuming that radio device 105 may communicate over 500 channels, however 500 channels is used merely as an example and other numbers of channels are within the scope of present embodiments. In other embodiments, list 640 may comprise one or more of an alphabetical list, a structured list, a list of folders and/or files, a list of values, and the like.

As depicted, memory 622 further stores scale data 641 comprising data defining scale values that may be identified by controller 620 based on corresponding sensed applied pressures at touch sensor 125. Scale data 641 will be discussed in further detail below.

While FIG. 6 depicts memory 622 explicitly storing each of list 640 and scale data 641, in other embodiments, one or more of list 640 and scale data 641 may be stored at application 636, in another memory, for example a memory of radio device 105, and/or a memory at controller 620 (e.g. as components of an application-specific integrated circuit and/or a field-programmable gate array). Hence, memory 622 may be optional, though items that are to be scrolled through may be in a list stored at another memory accessible to controller 620.

At least one output device 619 may comprise one or more of a display device, a speaker, a haptic device, and the like. Furthermore, at least one output device 619 may be located one or more of at knob-like structure 100 and at radio device 105 to which knob-like structure 100 is attachable. For example, at least one output device 619 may comprise one or more of: front display 139, light emitting diodes 150, a speaker, and haptic device 195 at knob-like structure 100. Alternatively, and/or in addition to, at least one output device 619 may comprise one or more of: a display device, a speaker and a haptic device at radio device 105 and/or any other device to which knob-like structure 100 is attachable and/or attached.

Similarly, one or more of controller 620 and memory 622 may be components of knob-like structure 100, and/or one or more of controller 620 and memory 622 may be components of radio device 105 (and/or any other device to which knob-like structure 100 is attachable and/or attached). For example, controller 620 may comprise a controller dedicated to controlling at least one output device 619 based on input and/or signals and/or data received from touch sensor 125, and controller 620 may be integrated into knob-like structure 100 and coupled to interface connector 130. Similarly, memory 622 (when present) may comprise a memory of knob-like structure 100. In these embodiments, controller 620 may be in communication with electrical components of radio device 105, and the like, via interface connector 130, including, but not limited to, a controller thereof, a memory thereof, and at least one output device thereof Alternatively, controller 620 may comprise a controller dedicated to controlling at least one output device 619 based on input and/or signals and/or data received from touch sensor 125, however controller 620 may be located at radio device, and the like, and in communication with touch sensor 125 of knob-like structure 100 using interface connector 130. In these embodiments, controller 620 may also be in communication with electrical components of radio device 105, and the like, via interface connector 130, including, but not limited to, a controller thereof, a memory thereof, and at least one output device thereof Alternatively, controller 620 may comprise a controller of radio device 105, and the like, which is in communication with touch sensor 125 of knob-like structure 100 using interface connector 130. Similarly, memory 622 may comprise a memory of radio device 105, and the like.

While not depicted, force-scalable stationary interface control 600 may further comprise a power source, including but not limited to a battery and/or a power pack, and/or a connection to an external power supply, or any other suitable power source. In particular, force-scalable stationary interface control 600 may be powered using a battery and/or a power pack of radio device 105, and the like.

In any event, it should be understood that a wide variety of configurations for force-scalable stationary interface control 600 are contemplated.

Attention is now directed to FIG. 7 which depicts a block diagram of a flowchart of a method 700 for controlling a force-scalable stationary interface control, according to non-limiting embodiments. In order to assist in the explanation of method 700, it will be assumed that method 700 is performed using controller 620, and specifically when controller 620 processes instructions stored at memory 622, for example application 636. Indeed, method 700 is one way in which controller 620 may be configured. Furthermore, the following discussion of method 700 will lead to a further understanding of controller 620, and its various components, as well as knob-like structure 100 and force-scalable stationary interface control 600. However, it is to be understood that controller 620 and/or method 700 and/or knob-like structure 100 and force-scalable stationary interface control 600 may be varied, and need not work exactly as discussed herein in conjunction with each other, and that such variations are within the scope of present embodiments.

Regardless, it is to be emphasized, that method 700 need not be performed in the exact sequence as shown, unless otherwise indicated; and likewise various blocks may be performed in parallel rather than in sequence; hence the elements of method 700 are referred to herein as "blocks" rather than "steps". It is also to be understood, however, that method 700 may also be implemented on variations of controller 620 and/or knob-like structure 100 and/or force-scalable stationary interface control 600.

At block 701, controller 620 identifies a first level of applied pressure sensed at touch sensor 125.

At block 703, controller 620 identifies a scrolling action based on a detected change in locations of the touch input sensed at touch sensor 125.

At block 705, controller 620 identifies a current scale of the scrolling action based on an identified first level of applied pressure.

At block 707, controller 620 controls at least one output device 619 to provide an identified current scale and an identified scrolling action.

Method 700 will now be described in more detail with respect to FIG. 8 to FIG. 17, assuming that method 700 is being implemented at force-scalable stationary interface control 600 to scroll through channels of radio device 105.

Attention is next directed to FIG. 8 which depicts a non-limiting example of scale data 641. As depicted, scale data 641 comprises a table of scale values and corresponding threshold values and/or rules. Each of the threshold values and/or rules are associated with a scale value that may be identified as being a current scale and/or an identified current scale based on a first level of applied pressure and/or a level of applied pressure sensed at touch sensor 125. In other words, a first level of applied pressure may comprise a level of applied pressure initially sensed at touch sensor 125 (e.g. before a scrolling action occurs); alternatively, method 700 may be repeated each time a level of applied pressure sensed at touch sensor 125 meets a threshold value and/or a threshold rule. Hence, a current scale may be identified at block 705 based on a first level of applied pressure and/or when a level of applied pressure meets threshold rules, and the like, as described hereafter (whether the level of applied pressure is a first level of applied pressure or not). For example, as depicted, scale data 641 comprises two threshold values and/or three rules, each associated with at least one scale value. For example, a first rule comprises: a current scale is to be set to a scale value "1" when applied pressure sensed at touch sensor 125 is less than or equal to threshold applied pressure P1. A second rule comprises: a current scale is to be set to a scale vale "10" when applied pressure sensed at touch sensor 125 exceeds threshold applied pressure P1 and is less than or equal to threshold applied pressure P2. A third rule comprises: a current scale is to be set to a scale value "100" when applied pressure sensed at touch sensor 125 exceeds threshold applied pressure P2.

In embodiments described herein, the threshold applied pressure P1 is less than threshold applied pressure P2. However, in other embodiments, other threshold applied pressures and/or rules may be used such that a current scale is set to smaller values as the applied pressure increases.

Furthermore, while scale data 641 is depicted in a table format, scale data 641 may be in any format compatible with memory 622 and/or controller 620.

Furthermore, each of threshold applied pressures P1, P2 may be provided in units compatible with output from touch sensor 125; however, in other embodiments, each of threshold applied pressures P1, P2 may be provided in in units different from output from touch sensor 125, and controller 620 may be configured to convert there between. However, hereafter, it will be assumed that each of threshold applied pressures P1, P2 and output from touch sensor 125 are provided in the same units.

Each of threshold applied pressures P1, P2 are generally provisioned at scale data 641 based on heuristic data and/or measured interactions between a fingers, and the like, a stylus, and the like, at touch sensor 125 (and/or a similar touch sensor). For example, threshold applied pressure P1 may correspond to a "small force" and threshold applied pressure P2 may correspond to a "high force" as determined by measuring interactions between fingers (and the like), a stylus (and the like) and touch sensor 125 (and/or a similar touch sensor) and/or as based on human factors measurements and the like.

In embodiments described herein, an identified current scale is to increase as a level of applied pressure increases. Hence, in these embodiments, when an applied pressure sensed at touch sensor 125 is less than or equal to threshold applied pressure P1, controller 620 may identify a current scale as "1"; when an applied pressure sensed at touch sensor 125 exceeds threshold applied pressure P1 but is less than or equal to threshold applied pressure P2, controller 620 may identify a current scale as "10"; and, similarly, when an applied pressure sensed at touch sensor 125 exceeds threshold applied pressure P2, controller 620 may identify a current scale as "100".

Hence, in these embodiments, scale data 641 includes scale values "1", "10" and "100", such that a current scale and/or an identified current scale may increase by one or more orders of magnitude as a level of applied pressure, sensed at touch sensor 125, exceeds respective threshold values.

Furthermore, while depicted embodiments include two threshold values of applied pressure, other embodiments may include one threshold value of applied pressure. In yet further embodiments, more than two threshold values of applied pressure may be used. Regardless, a current scale may be set to a first scale value when the applied pressure sensed by touch sensor 125 is less than a threshold value of applied pressure, and a current scale may be set to a second scale value when the applied pressure sensed by touch sensor 125 exceeds the threshold value of applied pressure.

Other scale values may be used that are not orders of magnitude in difference. For example, as described herein, knob-like structure 100 may be used to scroll through and select a channel of a radio that has channels 1 to 500 (e.g. as stored in list 640). However, when a number of channels is smaller, for example 100 channels, the scale values may be set to values compatible and/or customized and/or selected according to the number of channels, for example "1", "2" and "5", and the like.

Similarly, when knob-like structure 100 is to be used to select items from list 640 that are not numbers (for example when list 640 comprises a list of alphanumeric items and/or folder names listed in alphabetical order and/or a structure list), the scale values of scale data 641 may be set to values compatible and/or customized and/or selected according to the items of list 640. Hence, for example, scale data 641 may be adapted to include scale values that are compatible with alphanumeric lists, which may include, but are not limited to: scroll rates that are indicative of faster and/or slower scrolling of a scrolling action, including faster and/or slower scrolling through list 640. In yet further embodiments, when list 640 comprises an alphabetical list and/or a structured list and/or a list with headers, a first scale value may comprise a scale value which causes scrolling according to first letters of items in the list (e.g. "A" to "B" to "C", and the like) and/or to headers, and the like, while, a second scale value may comprise a scale value which causes alphabetical scrolling according to the remaining letters of alphabetical items in the list, and/or within items categorized under the headers.

Attention is next directed to FIG. 9 which depicts a sequence of views 9-I, 9-II, 9-III of a hand 901 interacting with knob-like structure 100, while method 700 is being implemented at controller 620. In particular, FIG. 9 depicts a non-limiting embodiment of blocks 701, 705 and a portion of block 707 of method 700. In particular, views 9-I, 9-II, 9-III depict different embodiments of identification of a current scale for scrolling through channels of radio device 105, and controlling at least one output device 619 to provide an identified current scale. In some embodiments, views 9-I, 9-II, 9-III may follow on from one another (e.g. view 9-II follows view 9-I in time, while view 9-III follows view 9-II in time); however, in other embodiments, each of views 9-I, 9-II, 9-III may occur independent of the other views. For clarity, a line is placed between each of views 9-I, 9-II, 9-III.

Each of views 9-I, 9-II, 9-III depict, in a respective upper portion, two fingers of hand 901 applying pressure to a knob-like structure 100, for example in a squeezing motion; while in each of the upper portions, radio device 105 is not depicted, is nonetheless assumed to be present.

However, while present embodiments are described with respect to two fingers of hand 901 applying pressure to knob-like structure 100, such application of pressure to knob-like structure 100 is appreciated to be an example only, and pressure may be applied to knob-like structure 100 by gloved fingers, other body parts (covered or uncovered), one or more styluses, and the like.

Each of views 9-I, 9-II, 9-III further depict, in a respective lower portion, a top view of knob-like structure 100 at radio device 105 (only a portion of which is depicted in broken lines) as blocks 701, 705 and a portion of block 707 is implemented at controller 620, in response to applied pressure being sensed at touch sensor 125.

In particular, a respective lower portion of each views 9-I, 9-II, 9-III depicts front display 139 and light emitting diodes 150 of knob-like structure 100, as well as an example speaker 910 of radio device 105; while example speaker 910 is depicted as being located adjacent to knob-like structure 100, speaker 910 may be located anywhere at radio device 105. Furthermore, while internal components of knob-like structure 100 are not depicted, such as touch sensor 125 and haptic device 195, they are nonetheless assumed to be present.

Furthermore, in each of views 9-I, 9-II, 9-III, a respective applied pressure 920-1, 920-2, 920-3 is represented by a corresponding pair of arrows. Furthermore, it is assumed that: applied pressure 920-1 in view 9-I is less than applied pressure 920-2 in view 9-II; and applied pressure 920-2 in view 9-II is less than applied pressure 920-3 in view 9-III.

In particular, in FIG. 9, it is also assumed that: applied pressure 920-1 in view 9-I is less than or equal to threshold applied pressure P1 of scale data 641; applied pressure 920-2 in view 9-II exceeds threshold applied pressure P1 and is less than or equal to threshold applied pressure P2 of scale data 641; and applied pressure 920-3 in view 9-III exceeds threshold applied pressure P2 of scale data 641. Hence respective arrows that represent applied pressure 920-1, 920-2, 920-3 increase in size and weight from view 9-I to view 9-II to view 9-III.

In other words, from view 9-I to view 9-II to view 9-III, two fingers of a hand 901 is squeezing knob-like structure 100 harder and/or increasing applied pressure on knob-like structure 100. A level of applied pressure sensed by touch sensor 125 hence increases from view 9-I to view 9-II, and again increases from view 9-II to view 9-III.

Figure 10:
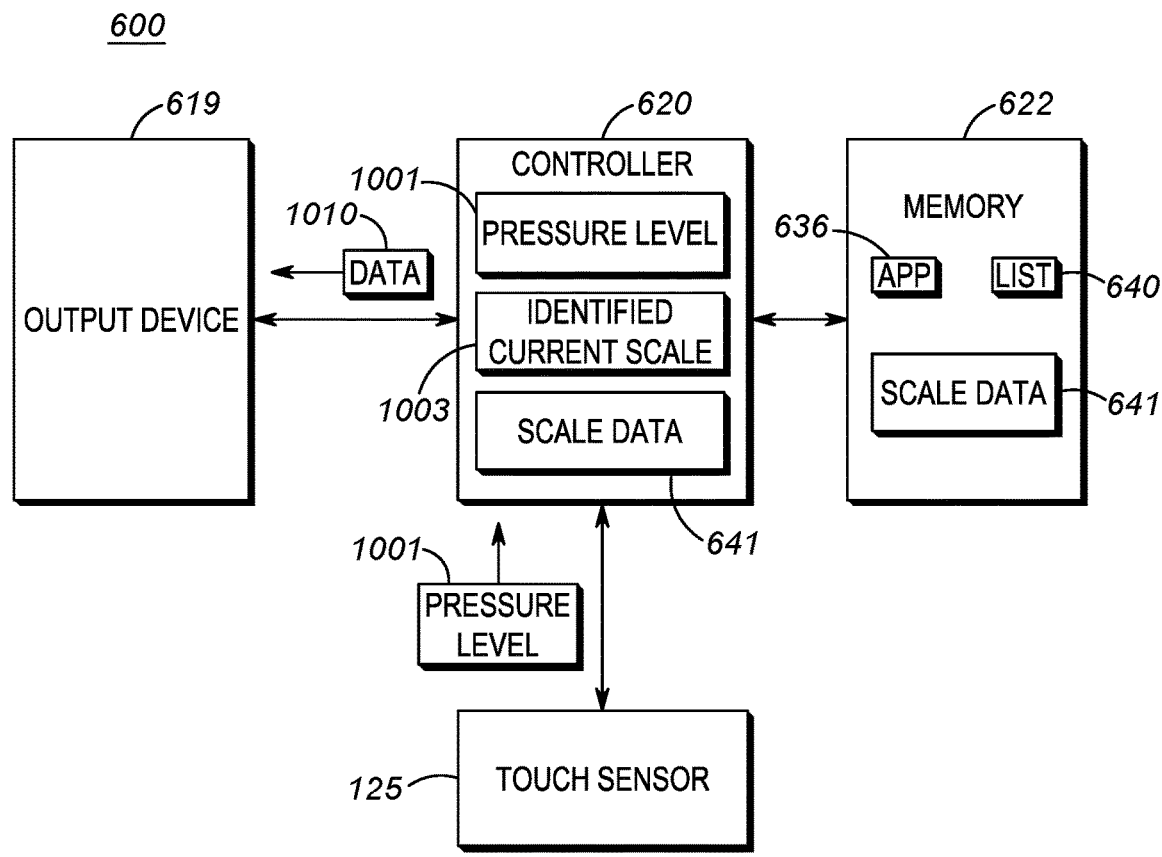
FIG. 10 depicts a controller of the force-scalable stationary interface control of FIG. 6 receiving data indicative of a level of applied pressure sensed by a touch sensor of the knob-like structure of FIG. 1, according to non-limiting embodiments.

For example, with brief reference to FIG. 10 (which is substantially similar to FIG. 6, with like elements having like numbers), controller 620 may receive, from touch sensor 125, data indicative of a level of applied pressure 1001 sensed by touch sensor 125 to identify (e.g. at block 701 of method 700), a level of applied pressure sensed at touch sensor 125 and/or a first level of applied pressure sensed at touch sensor 125. Furthermore, controller 620 may identify (e.g. at block 705 of method 700) a current scale 1003 by comparing level of applied pressure 1001 to with threshold values and/or threshold rules of scale data 641. Furthermore, as will be described hereafter, controller 620 may transmit signals and/or data 1010 to at least one output device 619 to control (e.g. at block 707 of method 700) at least one output device 619 to provide identified current scale 1003.

Returning to view 9-I of FIG. 9, as applied pressure 920-1 is less than or equal to threshold applied pressure P1, a current scale is identified (e.g. at block 705 of method 700) as "1". Hence controller 620 (e.g. at block 707 of method 700) controls at least one output device 619 to provide an identified current scale of "1".

As depicted in view 9-I, four output devices are controlled to provide the identified current scale of "1": front display 139 is controlled to provide the numeral "1" associated with an identified current scale of "1"; at least one light emitting diode 150 is controlled to a color associated with an identified current scale of "1", for example, as depicted, the color green; haptic device 195 is controlled to provide a haptic output 931-1 associated with an identified current scale of "1", for example, as depicted, a single vibration (indicated by one waved line); and speaker 910 is controlled to provide an audio output 941-1 associated with an identified scale of "1", for example, as depicted, the word "1" and/or "ONE". Indeed, audio output from speaker 910 may be output as words of a spoken language, other than when audio output from speaker 910 is in the form of beeps, and the like.

A particular color of light emitting diodes 150 and/or a particular haptic output of haptic device 195 and/or a particular audio output of speaker 910, each associated with an identified current scale of "1", may be provisioned at memory 622 and/or at application 636; and furthermore other colors, haptic outputs and audio responses may be used to provide an identified current scale of "1", and/or other identified current scales such as an identified current scale of "10" and/or "100" as described below.

Furthermore, while present embodiments are described with respect to controller 620 controlling four output devices to provide an identified current scale and/or a current scale, controller 620 may control as few as one output devices to provide an identified current scale and/or a current scale. Indeed, controller 620 may be configured to control as many output devices to provide an identified current scale and/or a current scale as are available at knob-like structure 100 and/or radio device 105 (and/or any other device to which knob-like structure 100 is attachable and/or attached). In some embodiments, specific output devices that are to provide an identified current scale and/or a current scale may be configured at radio device 105, and the like, using switches, a menu system provided at a display thereof, and/or by receiving touch input at knob-like structure 100 (e.g. at touch panel 140 and/or at touch panel 536*a*, when present), and the like.

Attention is next directed to view 9-II, in which it is assumed that applied pressure 920-2 exceeds threshold applied pressure P1 and is less than or equal to threshold applied pressure P2, and a current scale is hence identified (e.g. at block 705 of method 700) as "10". Hence controller 620 (e.g. at block 707 of method 700) controls at least one output device 619 to provide an identified current scale of "10".

As depicted in view 9-II, four output devices are controlled to provide the identified current scale of "10": front display 139 is controlled to provide the numeral "10" associated with an identified current scale of "10"; at least one light emitting diode 150 is controlled to a color associated with an identified current scale of "10", for example, as depicted, the color yellow; haptic device 195 is controlled to provide a haptic output 931-2 associated with an identified current scale of "10", for example, as depicted, two vibrations vibration (indicated by two waved lines); and speaker 910 is controlled to provide an audio output 941-2 associated with an identified scale of "10", for example, as depicted, the word "10" and/or "TEN". Again controller 620 may control as few as one output device to provide an identified current scale and/or a current scale.

Similarly, in view 9-III, it is assumed that applied pressure 920-3 exceeds threshold applied pressure P2, and a current scale is hence identified (e.g. at block 705 of method 700) as "100". Hence controller 620 (e.g. at block 707 of method 700) controls at least one output device 619 to provide an identified current scale of "100".

As depicted in view 9-III, four output devices are controlled to provide the identified current scale of "100": front display 139 is controlled to provide the numeral "100" associated with an identified current scale of "100"; at least one light emitting diode 150 is controlled to a color associated with an identified current scale of "100", for example, as depicted, the color red; haptic device 195 is controlled to provide a haptic output 931-3 associated with an identified current scale of "100", for example, as depicted, two vibrations vibration (indicated by two waved lines); and speaker 910 is controlled to provide an audio output 941-3 associated with an identified scale of "100", for example, as depicted, the word "100" and/or "ONE HUNDRED" (and/or "HUNDRED", and the like"). Again controller 620 may control as few as one output device to provide an identified current scale and/or a current scale.

In particular, when controller 620 (e.g. at block 707 of method 700) controls at least one output device 619 to provide an identified current scale non-visually, for example using speaker 910 and/or haptic device 195, a current scale may be non-visually identified.

Furthermore, by increasing or decreasing applied pressure at knob-like structure 100, a current scale of a scrolling action may be identified by controller 620, such as scrolling through list 640, and/or scrolling through radio channels, and the like.

In particular, controller 620 may identify a current scale based on a first level of applied pressure sensed at touch sensor 125. For example, while FIG. 9 depicts applied pressure increasing at knob-like structure 100 from view 9-I to view 9-II to view 9-III, applied pressure 920-3 may initially be applied without pausing at applied pressure 920-1, 920-2. In other words, controller 620 may control at least one output device 619 according to view 9-III without otherwise controlling at least one output device 619 to provide output according to views 9-I, 9-II.

Put another way, controller 620 may be configured to identify a current scale as a first identified scale level (e.g. scale level "1") when an identified first level of applied pressure 920-1 is below a threshold value (e.g. applied pressure threshold value P1); and identify the current scale as a second identified scale level (e.g. scale level "10") when an identified first level of applied pressure 920-2 is above the threshold value (e.g. applied pressure threshold value P2).

Furthermore, in some embodiments, controller 620 may be further configured to identify a current scale of a scrolling action based on an identified first level of applied pressure and/or an identified level of applied pressure when the level of applied pressure is sensed at touch sensor 125 for a given time period, for example one second and the like.

Alternatively, controller 620 may be further configured to identify a current scale of a scrolling action based on an identified first level of applied pressure and/or an identified level of applied pressure when the level of applied pressure is sensed at touch sensor 125 for a given time period and/or a sequence of applied pressure is sensed at touch sensor 125; for example, in these embodiments, when at least one output device 619 provides a current scale that corresponds to a scale that is to be identified as a current scale, additional pressure may be received at touch sensor 125 for a brief time period (for example less than half a second, and the like (and/or time periods corresponding to a pulse of applied pressure)); hence, when controller 620 identifies a first level of applied pressure (and/or a level of applied pressure) sensed at touch sensor 125 followed by a brief increase in applied pressure (e.g. the applied pressure increases and then decreases within a respective given time period), controller 620 may identify the current scale identified according to the first level of applied pressure as being an identified current scale.

Alternatively, controller 620 may be further configured to identify a current scale of a scrolling action based on an identified first level of applied pressure and/or an identified level of applied pressure when the level of applied pressure is sensed at touch sensor 125 and further touch input is received at, for example, another location of touch sensor 125 and/or at touch panel 140 and/or at touch panel 536*a* (when present). For example, knob-like structure 100 may be squeezed at two locations (e.g. using two fingers), as described above, and when one or more output devices indicate a current scale that is to be used in a scrolling action, touch input may be received at another location of touch sensor 125 and/or touch panel 140 and/or touch panel 536*a* (when present) by way of, for example, another finger not used in squeezing knob-like structure 100.

In some embodiments, once controller 620 identifies a current scale, controller 620 may control at least one output device 619 to provide a further indication of identifying the current scale, for example, controlling speaker 910 to provide a beep and the like and/or controlling light emitting diodes 150 and/or front display 139 to provide a brief increase in brightness, and/or controlling haptic device 195 to vibrate.

Figure 11:
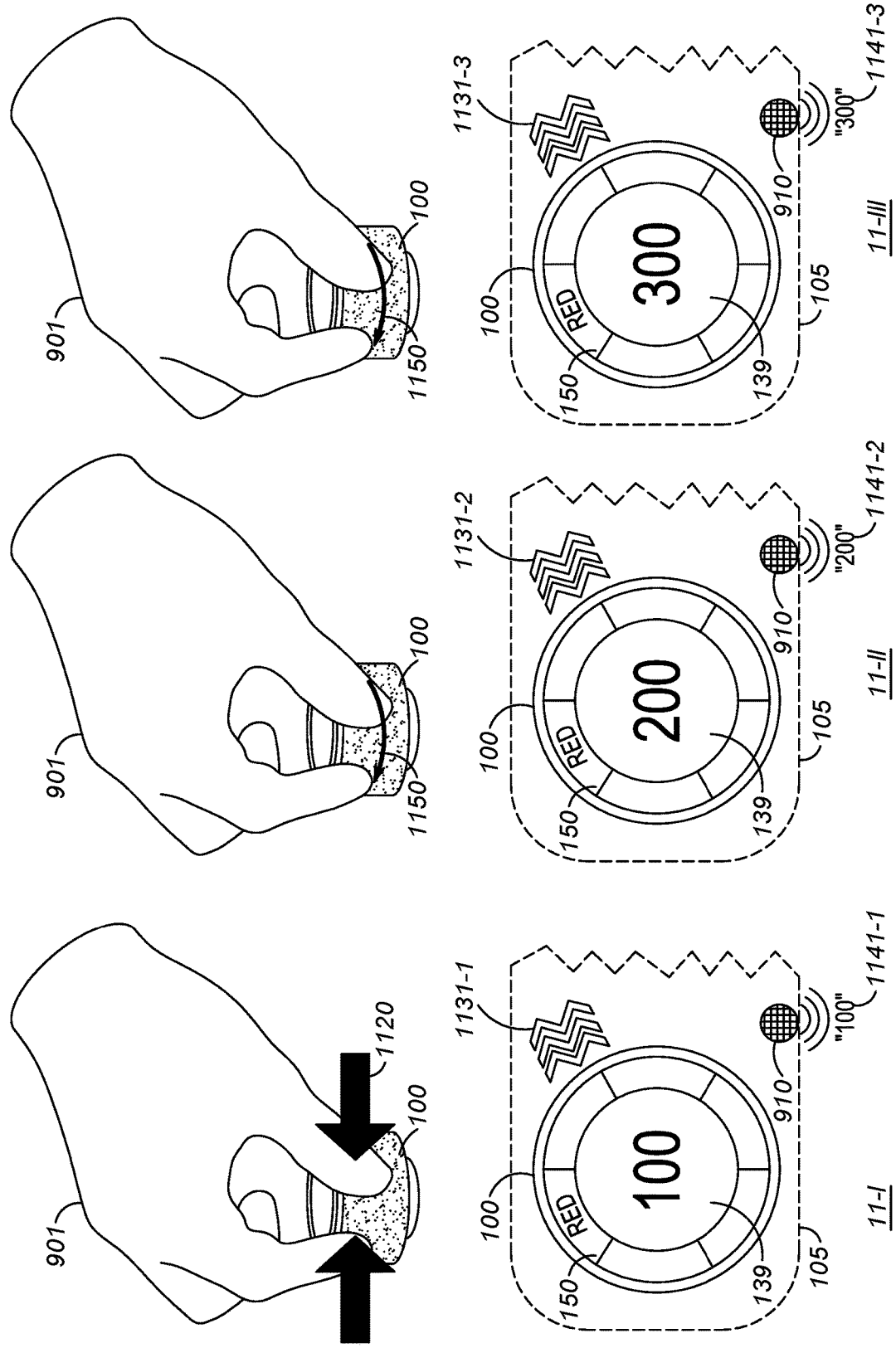
FIG. 11 is a sequence of views of another interaction with the knob-like structure of FIG. 1, according to non-limiting embodiments.

Attention is next directed to FIG. 11 which depicts a sequence of views 11-I, 11-II, 11-III in which two fingers of hand 901 are interacting with knob-like structure 100, while method 700 is being implemented at controller 620.

In particular, FIG. 11 depicts a non-limiting embodiment of blocks 701, 703, 705, 707 of method 700. Furthermore, FIG. 11 is similar to FIG. 9, with like elements having like numbers. However, views 11-I, 11-II, 11-III depict a particular identification of a current scale for scrolling through channels of radio device 105, identifying a scrolling action for scrolling through channels of radio device 105, and controlling at least one output device 619 to provide an identified current scale and an identified scrolling action. It is further assumed that views 11-I, 11-II, 11-III may follow on from one another (e.g. view 11-II follows view 11-I in time, while view 11-III follows view 11-II in time).

In particular, view 11-I is similar to view 9-III of FIG. 9 and it is assumed that applied pressure 1120 comprises an initial applied pressure and/or a first level of applied pressure sensed at touch sensor 125, applied pressure 1120 being similar to applied pressure 920-3. Hence applied pressure 1120 exceeds applied pressure threshold value P2.

Hence, in view 11-I, controller 620 (e.g. at block 701 of method 700) identifies a first level of applied pressure 1120 sensed at touch sensor 125. Similarly, in view 11-I, controller 620 (e.g. at block 705 of method 700) identifies a current scale of a scrolling action based on identified first level of applied pressure 1120 as "100", and further (e.g. a block 707 of method 700), controls at least one output device 619 to provide an identified current scale (e.g. "100"). In particular, front display 139 is controlled to provide the numeral "100", at least one light emitting diode 150 is controlled to the color red, haptic device 195 is controlled to provide a haptic output 1131-1 (similar to haptic output 931-3), and speaker 910 is controlled to provide an audio output 1141-1 similar to audio output 941-3. Again controller 620 may control as few as one output device to provide an identified current scale and/or a current scale.

Attention is next directed to view 11-II in which the two fingers of hand 901 are interacting with knob-like structure 100 after controller 620 identifies a current scale as being "100". In particular, the two fingers of hand 901 slide and/or move along knob-like structure 100 in a rotating motion; however, knob-like structure 100 does not rotate as knob-like structure 100 is fixed at radio device 105. Hence, touch sensor 125 senses a change in locations of touch input 1150 and, in response, controller 620 (e.g. at block 703 of method 700) identifies a scrolling action based on a detected change in the locations of touch input 1150 sensed at touch sensor 125. In particular, an identified scrolling action may comprise scrolling through channels of radio device 105 by the identified current scale, and in particular scrolling through channels of radio device 105 by increments of "100". While touch input 1150 is received, applied pressure 1120 may change and/or be maintained without affecting the identified current scale.

Furthermore, controller 620 (e.g. at block 707 of method 700) controls at least one output device to provide the identified scrolling action. For example, comparing view 11-I to view 11-II, controller 620 controls front display 139 to scroll from numeral "100" to numeral "200" (e.g. an increment of "100"). In addition, controller 620 controls speaker 910 to output audio output 1141-2 comprising the words "200". In addition, controller 620 may continue to control light emitting diodes 150 to the color red indicative of the identified current scale; and, controller 620 may further control haptic device 195 to provide haptic output 1131-2 indicative of a change in the scrolling action by a scale value of "100

View 11-III is similar to view 11-II, however in view 11-III, changes in locations of touch input 1150 continue to be sensed at touch sensor 125, and controller 620 (e.g. at block 707 of method 700) continues to control at least one output device 619 to provide the identified scrolling action. For example, comparing view 11-II to view 11-III, controller 620 controls front display 139 to scroll from numeral "200" to numeral "300" (e.g. an increment of "100"). In addition, controller 620 controls speaker 910 to output audio output 1141-3 comprising the words "300". In addition, controller 620 may continue to control light emitting diodes 150 to the color red indicative of the identified current scale; and, controller 620 may further control haptic device 195 to provide haptic output 1131-3 indicative of a change in the scrolling action by a scale value of "100", each time an increment of "100" occurs.

In this manner, a scrolling action is identified and further implemented at controller 620, and channels of radio device 105 are scrolled from channel 100 to channel 200 to channel 300. Furthermore, as the scrolling action occurs, controller 620 and/or radio device 105 may further switch to a corresponding current channel as provided by at least one output device 619. Alternatively, controller 620 and/or radio device 105 may switch to a corresponding current channel as provided by at least one output device 619 when it is determined that the scrolling action is complete, for example when detected changes in locations of touch input 1150 do not occur for a given time period, for example one second and the like.

Figure 12:
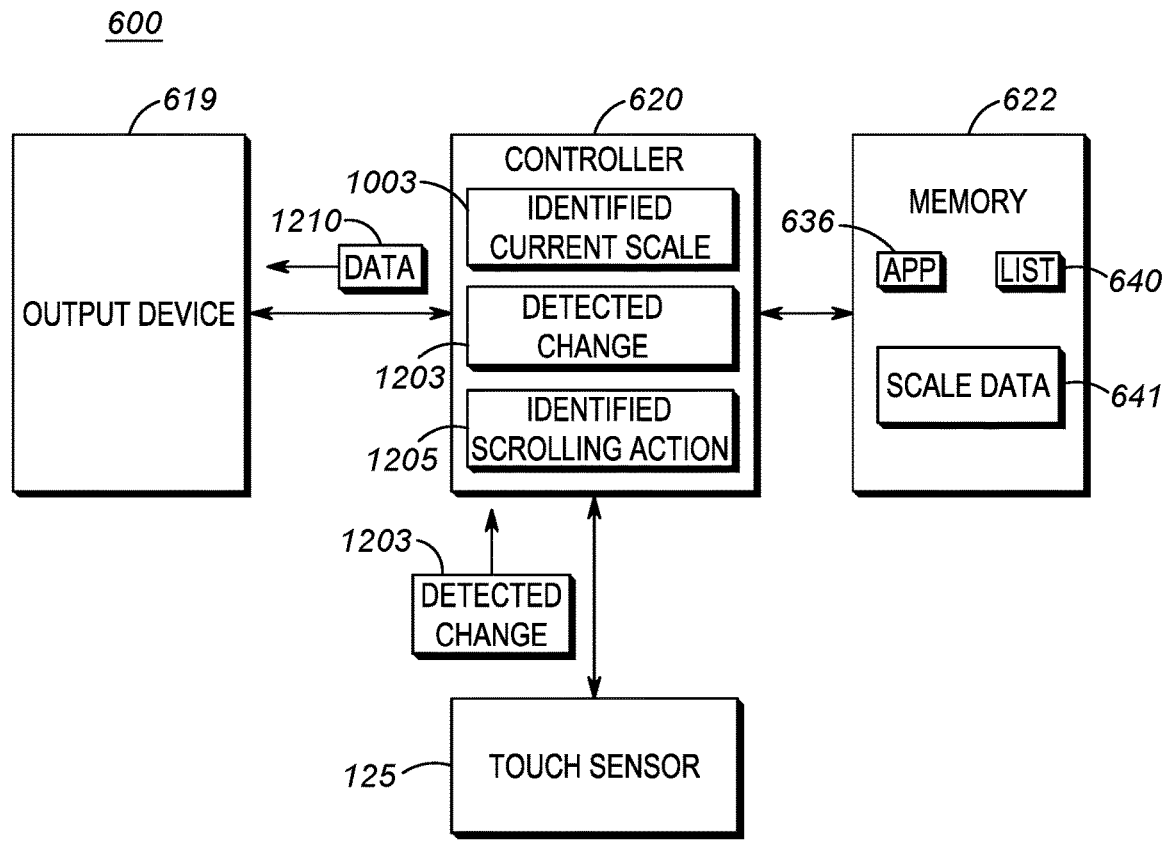
FIG. 12 depicts a controller of the force-scalable stationary interface control of FIG. 6 receiving data indicative of a detected change in locations of touch input sensed by the touch sensor, according to non-limiting embodiments.

Attention is next directed to FIG. 12, which is substantially similar to FIG. 10, with like elements having like numbers. In FIG. 12, it is assumed that controller 620 has identified current scale 1003, as described above with reference to FIG. 9, FIG. 10 and FIG. 11.

Furthermore, in FIG. 12, controller 620 receives, from touch sensor 125, data indicative of a detected change 1203 in locations of touch input 1150 sensed at the touch sensor 125 to identify (e.g. at block 703 of method 700), a scrolling action 1205, which may be further based on identified current scale 1003 as described above. Controller 620 may transmit signals and/or data 1210 to at least one output device 619 to control (e.g. at block 707 of method 700) at least one output device 619 to provide identified scrolling action 1205. Hence, as the interaction between the two fingers of hand 901 with knob-like structure 100 occur according to views 11-I, 11-II, 11-III, force-scalable stationary interface control 600 may operate as depicted in FIG. 12.

Attention is next directed to FIG. 13, which is substantially similar to FIG. 11, with like elements having like numbers. FIG. 13 depicts a sequence of views 13-I, 13-II, 13-III which may follow, in time, from view 11-III. It is further assumed that views 13-I, 13-II, 13-III may follow on from one another (e.g. view 13-II follows view 13-I in time, while view 13-III follows view 13-II in time).

Hence, in view 13-I, the scrolling action depicted in views 11-II, 11-III has resulted in at least one output device 619 providing an indication of channel 300 and/or in controller 620 and/or radio device 105 switching to channel 300.

However, in view 13-1, applied pressure at knob-like structure 100 and touch sensor 125 again changes to applied pressure 1320 and hence method 700 may again be implemented at controller 620. Hence, views 13-I, 13-II, 13-III depict a particular identification of a current scale for scrolling through channels of radio device 105, and in particular scrolling through channels of radio device 105 by increments of "10", identifying a scrolling action for scrolling through channels of radio device 105, and controlling at least one output device 619 to provide an identified current scale and an identified scrolling action.

In particular, in view 13-I, the two fingers of hand 901 further interact with knob-like structure 100, to again apply a pressure to touch sensor 125 to again identify a current scale of scrolling action.

For example, after the scrolling action of FIG. 11 is implemented, pressure applied to knob-like structure 100 and/or touch sensor 125 may be relaxed and/or removed, and then pressure may again be applied to knob-like structure 100 and/or touch sensor 125, as applied pressure 1320 of view 13-I (which may be similar to applied pressure 920-2) to cause controller 620 to again implementing method 700 to identify a current scale as "10". Alternatively, touch input may be received at one or more of another location at knob-like structure 100 and/or touch sensor 125 to indicate that a current scale is to be changed, for example at touch panel 140 and/or at touch panel 536a (when present), to cause controller 620 to again implementing method 700 to identify a current scale as "10".

Regardless, controller 620 again implements blocks 701, 705 and a portion of block 707 of method 700 to again identify a first level of applied pressure 1320 sensed at the touch sensor to identify a current scale as "10", and control at least one output device 619 to provide an identified current scale as "10". In some of these embodiments, controller 620 may briefly control front display 139 to provide the numeral "10", as in view 9-II, before again providing numeral "300", and implementing an identified scrolling action.

However, as depicted, controller 620 may alternatively control front display 139 to maintain the numeral "300" (and/or whichever numeral is currently being provided), and control other output devices to provide an indication of an identified current scale. In particular, as depicted, controller 620 controls one or more light emitting diodes 150 to the color yellow (i.e. associated with an identified current scale of "10") and/or controller 620 controls haptic device 195 to provide haptic output 1331-1 associated with an identified current scale of "10" (similar to haptic output 931-2) and/or controller 620 controls speaker 910 to output audio output 1341-1 indicating that the identified current scale has changed to "10". As depicted, audio output 1341-1 comprises words "CHANGE SCALE TO 10", however, in other embodiments, audio output 1341-1 may be similar to audio output 941-2 and hence may comprise the word "10" and/or "TEN".

With reference to views 13-II, 13-III, a scrolling action is again identified and controller 620 again implements blocks 703, 707 of method 700 to identify a scrolling action and control at least one output device 619 to provide an identified scrolling action based on a detected change in locations of touch input 1350 (similar to touch input 1150) and the identified scrolling action. Hence, comparing views 13-I, 13-II, 13-III, controller 620 controls front display 139 to scroll from numeral "300" to numeral "310" to numeral "320" (e.g. scrolling occurs in increments of "10"), and further controls speaker 910 to provide audio output 1341-2, 1341-3 indicative of the scrolling action (e.g. audio output 1341-2 comprises the words "310" and audio output 1341-3 comprises the words "320"). Controller 620 may alternatively control haptic device 195 to provide haptic output 1331-2, 1331-3, each indicative of a change in the scrolling action by a scale value of "10". Furthermore, one or more light emitting diodes 150 may continue to provide the color yellow, indicative of the identified current scale of "10".

Figure 14:
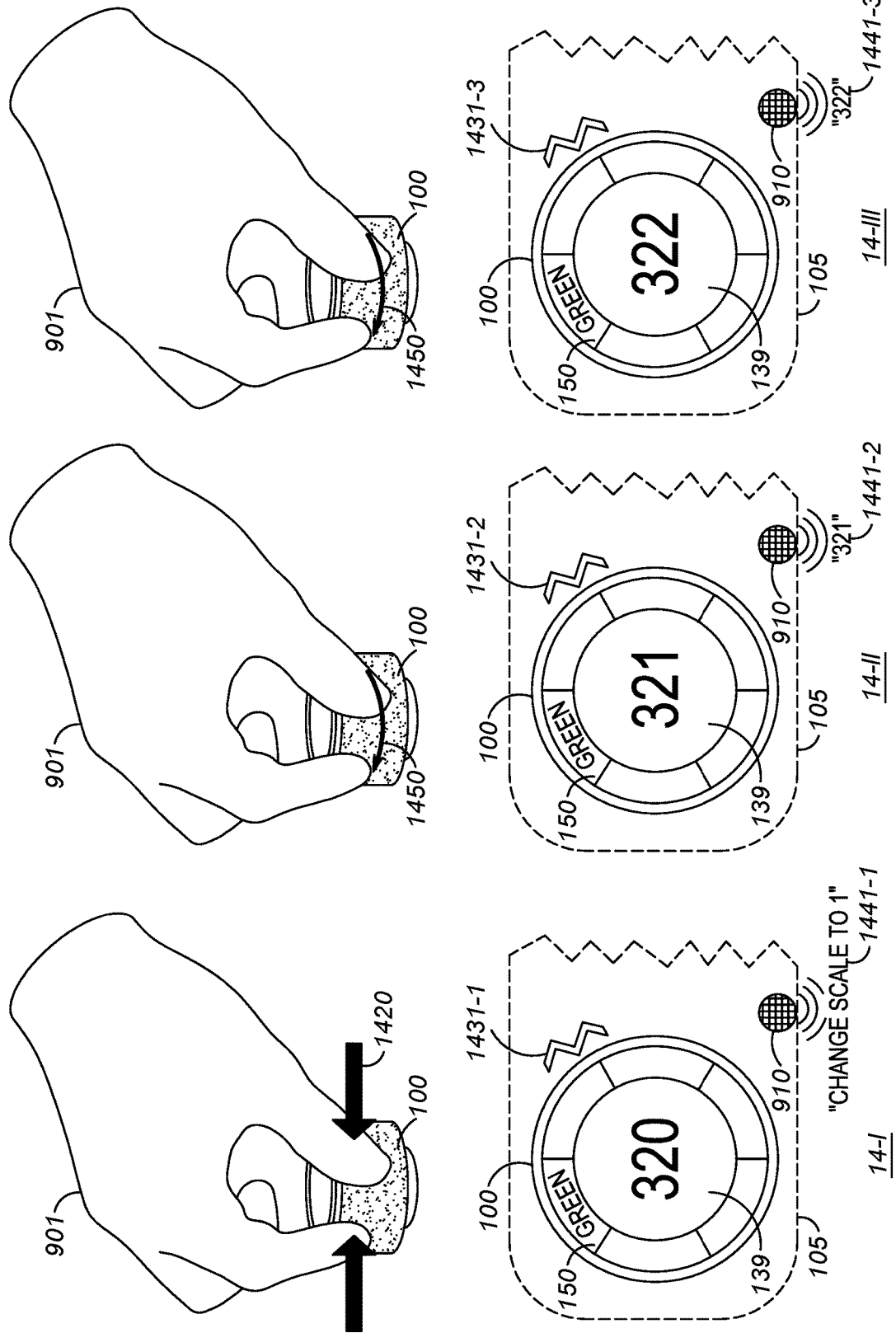
FIG. 14 is a sequence of views of another interaction with the knob-like structure of FIG. 1, which may follow from the sequence of FIG. 13, according to non-limiting embodiments.

Attention is next directed to FIG. 14, which is substantially similar to FIG. 13, with like elements having like numbers, and FIG. 14 depicts a sequence of views 14-I, 14-II, 14-III which may follow in time from view 13-III. It is further assumed that views 14-I, 14-II, 14-III may follow on from one another (e.g. view 14-II follows view 14-I in time, while view 14-III follows view 14-II in time).

Hence, in view 14-I, the scrolling action depicted in views 13-II, 13-III has resulted in at least one output device 619 providing an indication of channel 320 and/or in controller 620 and/or radio device 105 switching to channel 320.

However, in view 14-1, applied pressure at knob-like structure 100 and touch sensor 125 again changes to applied pressure 1420 and hence method 700 may again be implemented at controller 620. Hence, views 14-I, 14-II, 14-III depict a particular identification of a current scale for scrolling through channels of radio device 105, and in particular scrolling through channels of radio device 105 by increments of "1", identifying a scrolling action for scrolling through channels of radio device 105, and controlling at least one output device 619 to provide an identified current scale and an identified scrolling action.

In particular, in view 14-I, the two fingers of hand 901 further interact with knob-like structure 100, to again apply a pressure to touch sensor 125 to again identify a current scale of scrolling action.

For example, after the scrolling action of FIG. 13 is implemented, pressure applied to knob-like structure 100 and/or touch sensor 125 may be relaxed and/or removed, and then pressure may again be applied to knob-like structure 100 and/or touch sensor 125, as applied pressure 1420 of view 14-I (which may be similar to applied pressure 920-1) to cause controller 620 to again implementing method 700 to identify a current scale as "1". Alternatively, touch input may be received at one or more of another location at knob-like structure 100 and/or touch sensor 125 to indicate that a current scale is to be changed, for example at touch panel 140 and/or at touch panel 536a (when present), to cause controller 620 to again implementing method 700 to identify a current scale as "1".

Regardless, controller 620 again implements blocks 701, 705 and a portion of block 707 of method 700 to again identify a first level of applied pressure 1420 sensed at the touch sensor to identify a current scale as "1", and control at least one output device 619 to provide an identified current scale as "1". In some of these embodiments, controller 620 may briefly control front display 139 to provide the numeral "1", as in view 9-I, before again providing numeral "320", and implementing an identified scrolling action.

However, as depicted, controller 620 may alternatively control front display 139 to maintain the numeral "320" (and/or whichever numeral is currently being provided), and control other output devices to provide an indication of an identified current scale. In particular, as depicted, controller 620 controls one or more light emitting diodes 150 to the color green (i.e. associated with an identified current scale of "1") and/or controller 620 controls haptic device 195 to provide haptic output 1431-1 associated with an identified current scale of "1" (similar to haptic output 931-3) and/or controller 620 controls speaker 910 to output audio output 1441-1 indicating that the identified current scale has changed to "1". As depicted, audio output 1441-1 comprises words "CHANGE SCALE TO 1", however, in other embodiments, audio output 1441-1 may be similar to audio output 941-1 and hence may comprise the word "1" and/or "ONE".

With reference to views 14-II, 14-III, a scrolling action is again identified and controller 620 again implements blocks 703, 707 to identify a scrolling action and control at least one output device 619 to provide an identified scrolling action based on a detected change in locations of touch input 1450 (similar to touch input 1150 and/or 1350) and the identified scrolling action. Hence, comparing views 14-I, 14-II, 14-III, controller 620 controls front display 149 to scroll from numeral "320" to numeral "321" to numeral "322" (e.g. scrolling occurs in increments of "1"), and further controls speaker 910 to provide audio output 1441-2, 1441-3 indicative of the scrolling action (e.g. audio output 1441-2 comprises the words "321" and audio output 1441-3 comprises the words "322"). Controller 620 may alternatively control haptic device 195 to provide haptic output 1431-2, 1431-3, each indicative of a change in the scrolling action by a scale value of "1". Furthermore, one or more light emitting diodes 150 may continue to provide the color green, indicative of the identified current scale of "1".

Hence, together, views 11-I, 11-II, 11-III, 13-I, 13-II, 13-III, 14-I, 14-II, 14-III depict how method 700 may be implemented one or more times at controller 620 to quickly scroll to channel 322 of radio device 105. Alternatively, an initial identification of a first current scale may be performed according to views 9-I, 9-II, 9-III. In other words, by receiving touch input in response to receiving squeezing and rotating touch input at touch sensor 125 of knob-like structure 100, controller 620 may control radio device 105 to scroll to channel 322 in about six increments (e.g. 100 to 200 to 300 to 310 to 320 to 321 to 322) rather than in 322 increments when scrolling between channels occurs only in increments of 1.

Furthermore, while present embodiments have been described with reference to each identified scrolling action including an increase in a given value selected from list 640, present embodiments further include identified scrolling actions where decreases occur. For example, in FIG. 11, a direction of a detected change in location of touch input 1150 may be opposite to that depicted, and scrolling may occur from "300" to "200", and the like. Similarly, in FIG. 13, a direction of a detected change in location of touch input 1350 may be opposite to that depicted, and scrolling may occur from "300" to "290", and the like. Similarly, in FIG. 14, a direction of a detected change in location of touch input 1450 may be opposite to that depicted, and scrolling may occur from "320" to "319", and the like.

Either way, as described herein controller 620 may be further configured to increase (or decrease) an identified current scale as a level of applied pressure, sensed at touch sensor 125, increases (or decreases). However, in other embodiments, controller 620 may be further configured to decrease an identified current scale as a level of applied pressure, sensed at touch sensor 125, increases.

Similarly, as described herein, controller 620 may be further configured to increase an identified current scale by one or more orders of magnitude as a level of applied pressure, sensed at touch sensor 125, exceeds one or more respective threshold values. For example, with reference to FIG. 9, as each level of applied pressure 920-1, 920-2, 920-3 increases past a threshold value defined in scale data 641, the identified current scale increases by a respective order of magnitude (e.g. 1 to 10 to 100). Similarly, with reference to views 11-1, 13-1, 14-1, as each level of applied pressure 1120, 1320, 1420 increases past a threshold value defined in scale data 641, the identified current scale increases by a respective order of magnitude.

Furthermore, in embodiments described heretofore, controller 620 is configured to: identify (and/or first identify) a current scale based on an identified first level of applied pressure sensed at touch sensor 125, and control at least one output device 619 to provide the identified current scale; and after the identified current scale is determined, control the at least one output device 619 to provide the identified scrolling action based on the identified current scale and a detected change of locations of touch input sensed at touch sensor 125. For example, in each of FIG. 11, FIG. 13 and FIG. 14, a current scale is identified prior to identifying a scrolling action, and further at least one output device 619 is controlled to provide an identified current scale prior to controlling at least one output device 619 to provide an identified scrolling action.

However, in other embodiments, controller 620 may be configured to identify a current scale based on an identified level of applied pressure (and/or an identified first level of applied pressure) sensed during sensing of a detected change in the locations of touch input at touch sensor 125.

Figure 15:
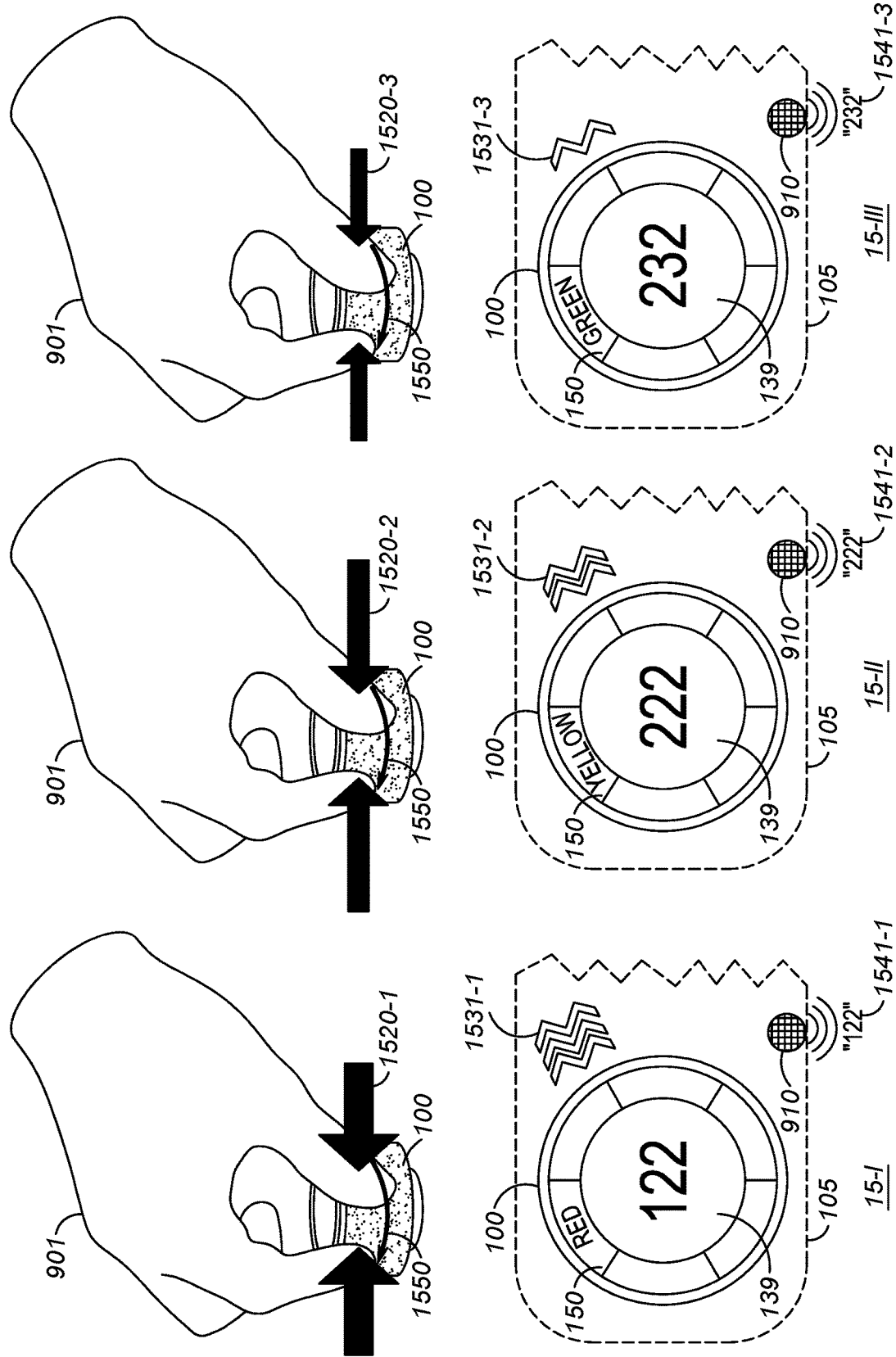
FIG. 15 is a sequence of views of another interaction with the knob-like structure of FIG. 1 to scroll to a channel of the radio of FIG. 1 using the force-scalable stationary interface control of FIG. 6, according to non-limiting embodiments.
Figure 16:
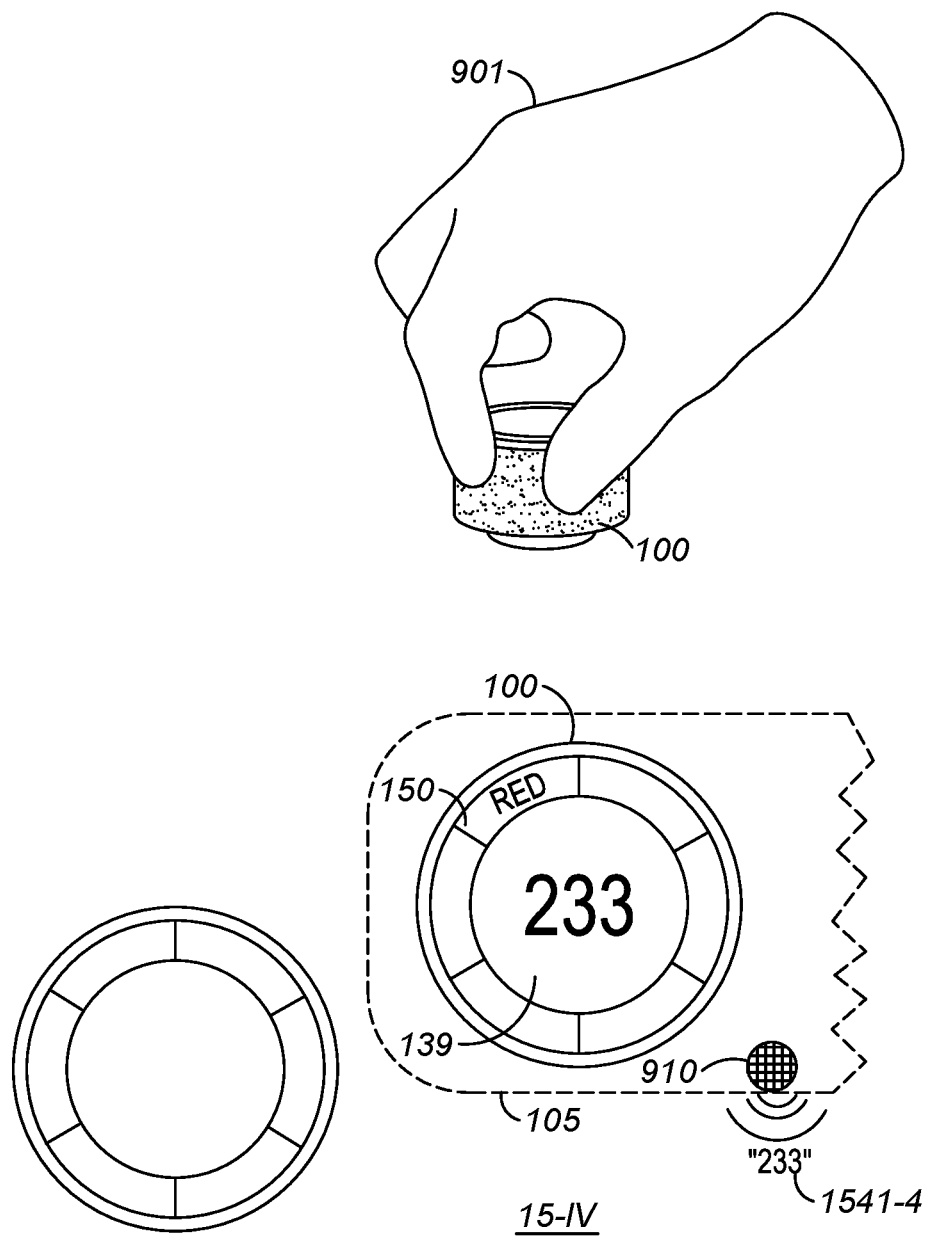
FIG. 16 is another view of the sequence of FIG. 15, according to non-limiting embodiments.

For example, attention is next directed to FIG. 15 and FIG. 16 which depict a sequence of views 15-I, 15-II, 15-III, 15-IV to scroll a channel of radio device 105 from channel 122 to channel 233 while controller 620 identifies a current scale based on an identified level of applied pressure sensed during sensing of a detected change in the locations of touch input at touch sensor 125. Hence, it is assumed in FIG. 15 and FIG. 16 that radio device 105 is initially set to channel 122, as depicted in view 15-I.

It is further assumed that views 15-I, 15-II, 15-III, 15-IV may follow on from one another (e.g. view 15-II follows view 15-I in time, view 15-III follows view 15-II in time, while view 15-IV follows view 15-III in time).

In particular, each view in FIG. 15 and FIG. 16 is similar to views in FIG. 9, FIG. 11, FIG. 13 and FIG. 14, with like elements having like numbers. However, in FIG. 15 and FIG. 16, applied pressure is sensed at touch sensor 125 while touch sensor 125 also senses changes in location of touch input.

Attention is hence first directed to view 15-I in which applied pressure 1520-1 (similar to applied pressure 920-3) is sensed at touch sensor 125 while touch input 1550 (similar to touch input 1150, 1350, 1450) is sensed at touch sensor 125. For example, two fingers of hand 901 may simultaneously squeeze knob-like structure 100 and move along knob-like structure 100 in a rotating motion. As such, controller 620 identifies a current scale based on a first level of applied pressure 1520-1 (e.g. at blocks 701, 705 of method 700) while also identifying a scrolling action based on a detected change in locations of touch input 1550 (e.g. at block 703 of method 700). In particular, an identified current scale is "100" and an identified scrolling action is to scroll the radio channels by increments of "100" as it assumed that applied pressure 1520-1 exceeds threshold applied pressure P2.

Furthermore, controller 620 may control each of one or more light emitting diodes 150 to a color (red) associated with the identified current scale of "100" and/or further control haptic device 195 to provide haptic output 1531-1 associated with the identified current scale of "100" (similar to haptic output 931-3).

However, in these embodiments, controller 620 continues to initially control front display 139 (e.g. at block 707 of method 700) to provide a numeral corresponding to a current channel number ("122"), and as applied pressure 1520-1 is detected, during changes in location of touch input 1550, controller 620 increments a numeral at front display 139 by the identified current scale of "100" (e.g. from numeral "122" to numeral "222"). As depicted, controller 620 similarly controls speaker 910 to change audio output 1541-1 ("122") to audio output 1541-2 ("222").

Hence, neither front display 139 nor speaker 910 is controlled to explicitly provide the identified current scale of "100", as in views 9-III, 11-I. Rather, in depicted embodiments, controller 620 controls front display 139 and speaker 910 to inherently provide an identified current scale by virtue of incrementing the output provided at front display 139 and/or speaker 910 by the identified current scale (e.g. an increment of "100").

With reference to view 15-II, while touch input 1550 is being received, applied pressure is reduced from applied pressure 1520-1 to applied pressure 1520-2 (similar to applied pressure 920-2). Hence, assuming that applied pressure 1520-2 exceeds threshold applied pressure P1, and is less than or equal to threshold applied pressure P2, controller 620 changes the identified current scale from "100" to "10", which may be provided at an output device by controlling one or more light emitting diodes 150 to change a color from red to yellow, and/or controlling haptic device 195 to provide haptic output 1531-2 (similar to haptic output 931-2). However, comparing view 15-II to view 15-III, controller 620 increments a numeral at front display 139 by the identified current scale of "10" (e.g. from numeral "222" to numeral "232"), and similarly controls speaker 910 to change audio output 1541-2 ("222") to audio output 1541-3 ("232").

Hence, again neither front display 139 nor speaker 910 is controlled to explicitly provide the identified current scale of "10", as in view 9-II. Rather, in depicted embodiments, controller 620 controls front display 139 and speaker 910 to inherently provide an identified current scale by virtue of incrementing the output provided at front display 139 and/or speaker 910 by the identified current scale (e.g. an increment of "10").

With reference to view 15-III, while touch input 1550 is being received, applied pressure is reduced from applied pressure 1520-2 to applied pressure 1520-3 (similar to applied pressure 920-1). Hence, assuming that applied pressure 1520-3 is less than or equal to threshold applied pressure P1, controller 620 changes the identified current scale from "10" to "1", which may be provided at an output device by controlling one or more light emitting diodes 150 to change a color from yellow to green, and/or controlling haptic device 195 to provide haptic output 1531-3 (similar to haptic output 931-1). However, comparing view 15-III to view 15-IV, controller 620 increments a numeral at front display 139 by the identified current scale of "1" (e.g. from numeral "232" to numeral "233"), and similarly controls speaker 910 to change audio output 1541-3 ("232") to audio output 1541-4 ("233").

Hence, again neither front display 139 nor speaker 910 is controlled to explicitly provide the identified current scale of "1", as in view 9-I. Rather, in depicted embodiments, controller 620 controls front display 139 and speaker 910 to inherently provide an identified current scale by virtue of incrementing the output provided at front display 139 and/or speaker 910 by the identified current scale (e.g. an increment of "1").

Put another way, in embodiments depicted in FIG. 15 and FIG. 16, controller 620 is further configured to control at least one output device 619 to provide an identified scrolling action after identifying the current scale and when a detected change in the locations of the touch input are sensed at touch sensor 125.

While view 15-IV depicts fingers of hand 901 continuing to interact with knob-like structure 100, further identification of a current scale and/or a scrolling action is not depicted and neither is further control of at least one output device 619. However, further interaction with knob-like structure 100 could include, but are not limited to, providing further touch input to again change a current scale and/or implement a scrolling action, and controller 620 controlling at least one output device 619 accordingly.

Regardless, FIG. 15 and FIG. 16 depict embodiments where controller 620 scrolls through channels of radio device 105 (and/or through list 640) in response to touch sensor 125 simultaneously receiving, squeezing and "rotating" touch input ,for example when two fingers of hand 901 squeeze and "rotate" knob-like structure 100. However, such rotation is appreciated to refer only to the motion of two fingers of hand 901 relative to knob-like structure 100 as knob-like structure 100 is generally fixed relative to radio device 105.

Persons skilled in the art will appreciate that there are yet more alternative embodiments and modifications possible. For example, embodiments described heretofore depicts controller 620 identifying a current scale and a scrolling action when knob-like structure 100 and touch sensor 125 are touched in two positions (e.g. a two fingers of hand 901 squeeze knob-like structure 100 and touch sensor 125). In other embodiments, controller 620 may identify a current scale and a scrolling action when knob-like structure 100 and touch sensor 125 are touched in one position (e.g. one finger of hand 901 and/or a stylus and the like applies pressure to knob-like structure 100 and touch sensor 125); however, such embodiments may lead to scrolling of channels occurring at radio device 105 when pressure is applied to knob-like structure 100 and touch sensor 125 accidentally. Hence, to prevent such accidental scrolling, in some embodiments, controller 620 may be further configured to identify a current scale and control at least one output device 619 to provide the identified current scale and the identified scrolling action when (and/or only when) a first level of applied pressure (and/or a level of applied pressure) is sensed at two or more positions around fixed surface 110 and/or at two or more positions around touch sensor 125.

In addition, while embodiments described heretofore are specific to scrolling through channels of radio device 105, method 700 may be used to scroll through other types of values, for example a volume of radio device 105.

Furthermore, while embodiments described heretofore are specific to scrolling through channels of radio device 105 method 700 may be used to scroll through other types of values and at other types of devices.

Figure 17:
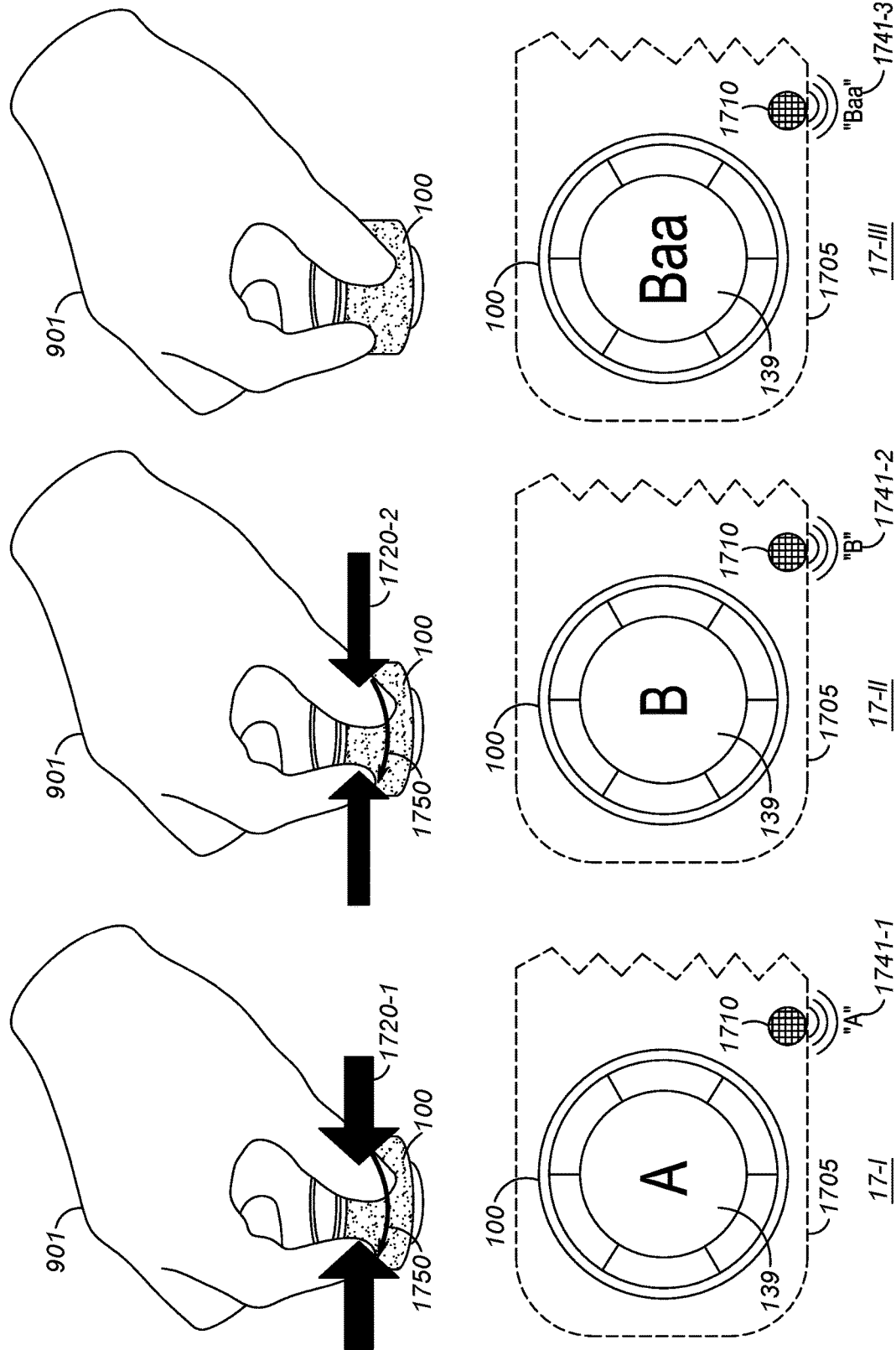
FIG. 17 is a sequence of views that show a knob-like structure being used to scroll through an alphabetical list, according to non-limiting embodiments.

For example, attention is next directed to FIG. 17 which depicts a sequence of views 17-I, 17-II, 17-III that show embodiments in which knob-like structure 100 is attached to a device 1705, and force-scalable stationary interface control 600 is integrated therewith. In particular, in FIG. 17, knob-like structure 100 may be used to scroll through an alphabetical list. In particular, similar to embodiments of FIG. 15 and FIG. 16, two fingers of hand 901 may simultaneously squeeze knob-like structure 100 and "rotate" along knob-like structure 100; in response, controller 620 may scroll through an alphabetical list. Device 1705 may comprise a portable device, a mobile device, and the like, including, but not limited to, a radio device. As depicted, device 1705 comprises a speaker 1710, similar to speaker 910.

It is assumed in FIG. 17 that front display 139 is adapted and/or configured to provide letters, words and the like.

It is further appreciated that knob-like structure 100 and/or device 1705 comprises force-scalable stationary interface control 600. However, in these embodiments, list 640 comprises a structured alphabetical list of words and/or file names and/or a structure list that includes headings. In particular, it is assumed in a non-limiting example, that list 640 includes a plurality of words beginning with the letter "A", a plurality of words beginning with the letter "B", and the like. Put another way, list 640 may comprise a list of words under headings that may include letters of the alphabet, such that the words are categorized by the first letter of each word.

For the example depicted in FIG. 17, it may be assumed that list 640 comprises words "All", "And", "Apple", "Baa", "Bad" While such a list is simple and comprises only five words, in other implementations list 640 may comprise any number of words.

It is further assumed in FIG. 17 that scale data 641 comprises a single threshold value (e.g. a given applied pressure), and that rules associated with the single threshold value include: scrolling through list 640 by first letter, and/or by heading, when a level of applied pressure exceeds the single threshold value; and scrolling through list 640 alphabetically and/or by words, when a level of applied pressure is less than, or equal to, the single threshold value (e.g. a given applied pressure), and hence, as changes are detected in a location of touch input 1750.

Hence, for example, in a view 17-I, controller 620 identifies a level of applied pressure 1720-1, which is assumed to exceed the single threshold value of scale data 641 hence controller 620 identifies a current scale comprising a scale value which causes scrolling according to first letters of items (and/or by header) in list 640 (e.g. "A" to "B" to "C", and the like). Hence, in view 17-I, controller 620 controls front display 139 to first provide the letter "A" and, in response to identifying applied pressure 1720-1, and a detected change in locations of touch input 1750, in view 17-II, controller controls front display 139 to provide the letter "B". In other words, rather than scroll through list 640 by individual word, as applied pressure 1720-1 is a threshold value when a detected change in touch input 1750 is sensed by touch sensor 125, controller 620 identifies a scrolling action as scrolling through first letters and/or headings of words in list 640.

Similarly, in view 17-I, speaker 1710 first provides audio output 1741-1 comprising the letter "A", while in view 17-II, speaker 1710 provides audio output 1741-2 comprising the letter "B". Hence, again, an identified scrolling action is to scroll at least from "A" to "B" of words in list 640.

In view 17-II, applied pressure 1720-2 at knob-like structure 100 is reduced to a pressure that is less than the threshold value in scale data 641, and hence, controller 620 identifies a current scale as a scale value which causes alphabetical scrolling according to the words in list 640 using a selected first letter as a starting position.

Hence, with reference to view 17-III, controller 620 identifies a scrolling action as incrementing word by word through list 640 starting with the letter "B"; as the first word in list 640 is "Baa", controller 620 controls front display 139 to provide the word "Baa", and similarly controls speaker 1710 to provide audio output 1741-3 comprising the word "Baa".

While view 17-III depicts fingers of hand 901 depicts fingers of hand 901 continuing to interact with knob-like structure 100, further identification of a current scale and/or a scrolling action is not depicted and neither is further control of at least one output device 619. However, further interaction with knob-like structure 100 could include, but are not limited to, providing further touch input to again change a current scale and/or implement a scrolling action, and controller 620 controlling at least one output device 619 accordingly.

Persons skilled in the art will appreciate that there are yet more alternative embodiments and modifications possible. For example, present embodiments have been described that include using a force-scalable stationary interface control to identify a current scale and a scrolling action, as well as to control at least one output device to provide an identified current scale and an identified scrolling action. However, in other embodiments, a force-scalable stationary interface control may be used to select a mode.

Figure 18:
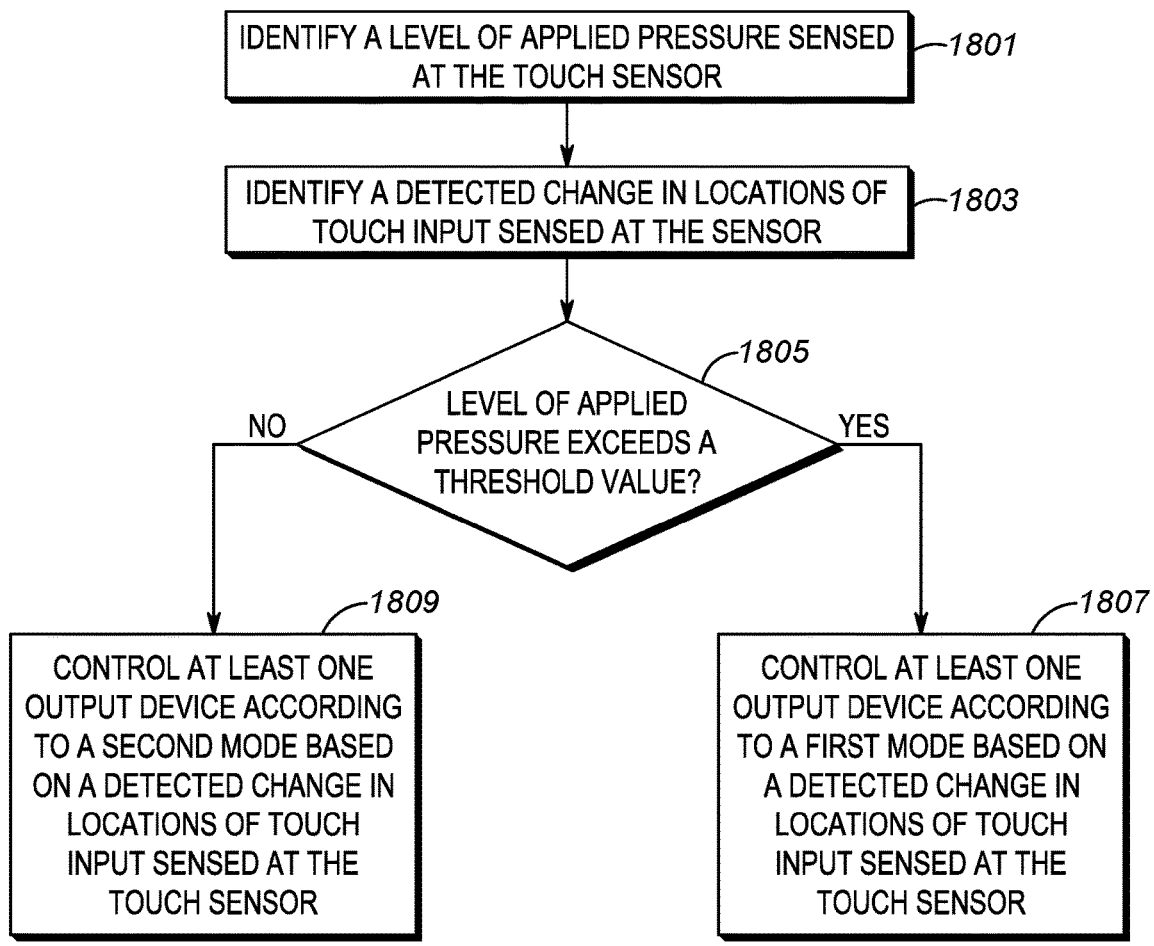
FIG. 18 is a block diagram of a flowchart of a method for controlling the force-scalable stationary interface control of FIG. 6, according to an alternative non-limiting embodiment.

For example, attention is now directed to FIG. 18 which depicts a block diagram of a flowchart of a method 1800 for controlling a force-scalable stationary interface control to select a mode, according to non-limiting embodiments. In order to assist in the explanation of method 1800, it will be assumed that method 1800 is performed using controller 620, and specifically when controller 620 processes instructions stored at memory 622, for example an application similar to application 636. Indeed, method 1800 is one alternative way in which controller 620 may be configured. Furthermore, the following discussion of method 1800 will lead to a further understanding of controller 620, and its various components, as well as knob-like structure 100 and force-scalable stationary interface control 600. However, it is to be understood that controller 620 and/or method 1800 and/or knob-like structure 100 and force-scalable stationary interface control 600 may be varied, and need not work exactly as discussed herein in conjunction with each other, and that such variations are within the scope of present embodiments.

Regardless, it is to be emphasized, that method 1800 need not be performed in the exact sequence as shown, unless otherwise indicated; and likewise various blocks may be performed in parallel rather than in sequence; hence the elements of method 1800 are referred to herein as "blocks" rather than "steps". It is also to be understood, however, that method 1800 may also be implemented on variations of controller 620 and/or knob-like structure 100 and/or force-scalable stationary interface control 600.

At block 1801, controller 620 identifies a level of applied pressure sensed at touch sensor 125.

At block 1803, controller 620 identifies a detected change in locations of touch input sensed at touch sensor 125.

At block 1805, controller 620 determines whether the level of applied pressure exceeds a threshold value, which may be stored at scale data 641 and/or at memory 622 instead of scale data 641.

When controller 620 determines, at block 1805 that the level of applied pressure exceeds a threshold value (e.g. a "Yes" decision at block 1805), at block 1807, controller 620 controls at least one output device 619 according to a first mode based on the detected change in locations of touch input sensed at touch sensor 125.

However, when controller 620 determines, at block 1805 that the level of applied pressure is less than or equal to the threshold value (e.g. a "No" decision at block 1805), at block 1809, controller 620 controls at least one output device 619 according to a second mode based on the detected change in locations of touch input sensed at touch sensor 125.

For example, in some embodiments, an applied pressure that exceeds a threshold value may be sensed at touch sensor 125, and in response, controller 620 scrolls through channels of a radio device when detected changes in touch input are sensed at touch sensor 125; and/or the applied pressure may be reduced to less than the threshold value, and in response, controller 620 scrolls through volume levels of a radio device when detected changes in touch input are sensed at touch sensor 125.

Non-limiting embodiments of method 1800 will now be described with reference to FIG. 19 and FIG. 20 which depict a sequence of views 19-I, 19-II, 19-III, 19-IV to first scroll to a channel of radio device 105 using knob-like structure 100, and then scroll to a volume level of radio device 105. It is assumed in FIG. 19 and FIG. 20 that radio device 105 is initially on a channel 3, and that a volume level is initially set to a value of 2 (e.g. as indicated by a number of light emitting diodes 150 that are shaded in views 19-I, 19-II, 19-III).

Figure 19:
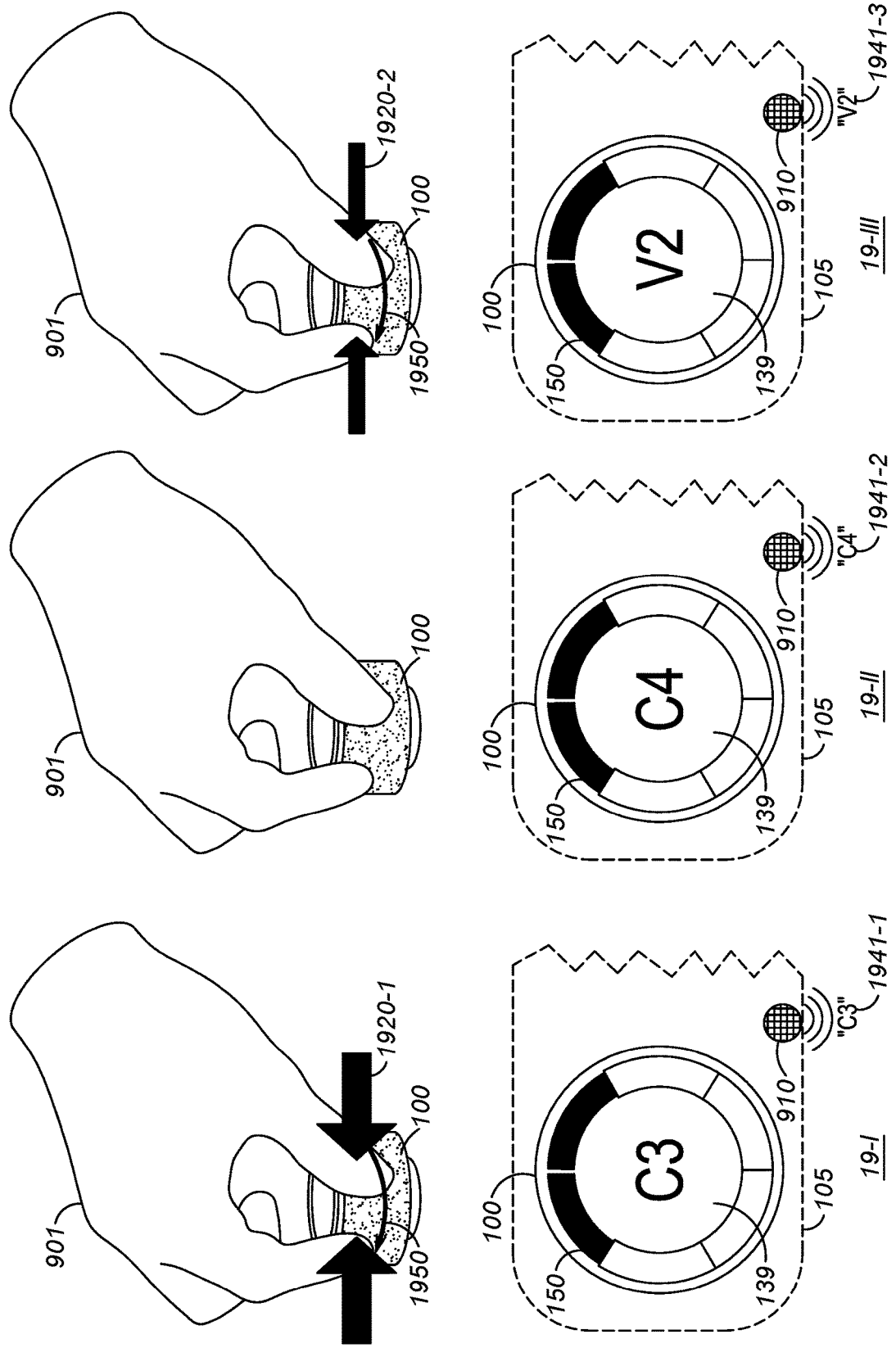
FIG. 19 is a sequence of views of another interaction with the knob-like structure of FIG. 1 to first control a volume of radio device using the knob-like structure of FIG. 1, and then control scrolling between channels of the radio device, according to non-limiting embodiments.

In particular, each view in FIG. 19 and FIG. 20 is similar to views in FIG. 15 and FIG. 16 with like elements having like numbers. However, in FIG. 19 and FIG. 20, control of haptic device 195 is not depicted for simplicity.

Attention is hence first directed to view 19-I in which applied pressure 1920-1 (similar to applied pressure 920-3) is sensed at touch sensor 125 while changes in locations of touch input 1950 (similar to applied touch input 1550) are sensed at touch sensor 125. For example, again, two fingers of hand 901 may simultaneously squeeze knob-like structure 100 and "rotate" along knob-like structure 100. Alternatively, applied pressure 1920-1 may be sensed prior to sensing of changes in locations of touch input 1950 as described with reference to FIG. 9 to FIG. 14.

As such, controller 620 identifies (e.g. at block 1801 of method 1800) a level of applied pressure 1920-1 sensed at touch sensor 125 and controller 620 identifies (e.g. at block 1803 of method 1800) a detected change in locations of touch input 1950 sensed at touch sensor 125.

Assuming that applied pressure 1920-1 exceeds a threshold value, when controller 620 compares (e.g. at block 1805 of method 1800) level of applied pressure 1920-1 to the threshold value, controller 620 determines that at least one output device 619 is to be controlled according to a first mode (e.g. at block 1807 of method 1800) which, as depicted, includes controlling front display 139 and/or speaker 910 to provide a scrolling action to scroll through channels of radio device 105 by scale value of "1" according to detected changes in locations of touch input 1950 sensed at touch sensor 125.

Hence, comparing view 19-I to view 19-II, in view 19-I, controller 620 controls front display 139 to provide alphanumeric characters "C3", indicating that an initial channel is 3, and controller 620 further controls speaker 910 to provide an audio output 1941-1 providing words "C3". In view 19-II, controller 620 controls front display 139 to provide alphanumeric characters "C4", indicating a scrolling action that results in a channel of radio device 105 being changed to channel 4 and controller 620 further controls speaker 910 to provide an audio output 1941-2 providing words "C4".

While the terms "C3" and "C4" are used to provide channels of radio device 105, other terms may be used to indicate channels of radio device 105; indeed, channels may be provided using numerals only.

With reference to view 19-III, assuming that scrolling between channels of radio device 105 is complete, pressure applied to knob-like structure 100 and touch sensor 125 is reduced to applied pressure 1920-2, which does not exceed the threshold value. Hence, when controller 620 compares (e.g. at block 1805 of method 1800) level of applied pressure 1920-2 to the threshold value, controller 620 determines (e.g. at block 1809 of method 1800) that at least one output device 619 is to be controlled according to a second mode which, as depicted, includes controlling front display 139 and/or speaker 910 to provide a scrolling action to scroll through volume levels of radio device 105 by scale value of "1" according to detected changes in locations of touch input 1950 sensed at touch sensor 125.

Hence, comparing view 19-III to view 19-IV of FIG. 20, in view 19-111 controller 620 controls front display 139 to provide alphanumeric characters "V2", indicating that an initial volume level of speaker 910 is 2, and controller 620 further controls speaker 910 to provide an audio output 1941-3 providing words "V2". In view 19-IV, controller 620 controls front display 139 to provide alphanumeric characters "V3", indicating a scrolling action that results in a volume level of speaker 910 being incremented by "1", and controller 620 further controls speaker 910 to provide an audio output 1941-4 providing words "V3". Furthermore, controller 620 may further increase the volume of speaker 910 from a volume level "2" to a volume level "3". As depicted, light emitting diodes 150 are controlled by controller 620 to include 3 light emitting diodes being in, as depicted in view 19-IV.

While the terms "V2" and "V3" are used to provide volume levels of radio device 105, other terms may be used to indicate volume levels of radio device 105; indeed, volume levels may be provided using numerals only.

In other words, a mode of operation of knob-like structure 100 and/or force-scalable stationary interface control 600 may change depending on a level of applied pressure sensed by touch sensor 125. Indeed, while changes in mode have been described with respect to controlling volume of a radio and channels of a radio, other modes are within the scope of present embodiments including, but not limited to, controlling other audio related modes such as bass, treble, balance and the like. For example, in some embodiments, knob-like structure 100 and force-scalable stationary interface control 600 may be integrated into a stereo system (including, but not limited to, a stereo system of a vehicle) and used to control different functions of the stereo system depending on the applied pressure sensed at knob-like structure 100.

Furthermore, a mode of operation of knob-like structure 100 and/or force-scalable stationary interface control 600 may be changed depending on touch input received at touch panel 140 and/or touch panel 536a (when present). For example, when a first sequence of touch input is received at touch panel 140 and/or touch panel 536a, knob-like structure 100 and/or force-scalable stationary interface control 600 may operate according to method 700, for example to efficiently scroll through channels of a radio device; and when a second sequence of touch input is received at touch panel 140 and/or touch panel 536a, knob-like structure 100 and/or force-scalable stationary interface control 600 may operate according to method 1800, for example to switch between using knob-like structure 100 to control volume and scroll through channels of radio device 105.

In any event, provided herein is a force-scalable stationary interface control which may be used to control at least one output device according to different modes. In some modes, the force-scalable stationary interface control may be used to identify a current scale of a scrolling action, depending on a sensed level of applied force at a knob-like structure that includes a pressure-sensitive touch sensor. The scrolling action may include scrolling through channels of a radio according to scale that changes as applied pressure sensed at the touch sensor increases. At least one output device is controlled to provide an identified current scale and an identified scrolling action. When the at least one output device is controlled to provide the identified current scale and the identified scrolling action using non-visual output, such as at a speaker and/or using a haptic device, control of the radio may occur without output devices at the radio being visible. Such embodiments may be useful, for example, when an emergency responder is using the radio in a situation where looking at the radio may be challenging, such as in a smoke-filled room and/or when the emergency responder is wearing protective face gear and/or protective breathing gear.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A force-scalable stationary interface control comprising:
a knob-like structure including an axis and a fixed surface located at least partially around the axis, the fixed surface about parallel to the axis;
a touch sensor located at least partially around the fixed surface, the touch sensor configured to sense a plurality of different levels of applied pressure and locations of touch input;
at least one output device; and
a controller coupled to the touch sensor and the at least one output device, the controller configured to:
identify a first level of applied pressure sensed at the touch sensor,
identify a scrolling action based on a detected change in locations of the touch input sensed at the touch sensor,
identify a current scale of the scrolling action based on an identified first level of applied pressure,
control the at least one output device to provide an identified current scale and an identified scrolling action,
identify the current scale and control the at least one output device to provide the identified current scale and the identified scrolling action when the first level of applied pressure is simultaneously sensed at two or more positions around the fixed surface due to two fingers squeezing the fixed surface.

2. The force-scalable stationary interface control of claim 1, wherein the touch sensor comprises: a first sensor configured to sense the plurality of different levels of applied pressure; and a second sensor configured to sense the locations of the touch input.

3. The force-scalable stationary interface control of claim 1, wherein the controller is further configured to increase the identified current scale as a level of applied pressure, sensed at the touch sensor, increases.

4. The force-scalable stationary interface control of claim 1, wherein the controller is further configured to increase the identified current scale by one or more orders of magnitude as a level of applied pressure, sensed at the touch sensor, exceeds one or more respective threshold values.

5. The force-scalable stationary interface control of claim 1, wherein the controller is further configured to:
identify the current scale as a first identified scale level when the identified first level of applied pressure is below a threshold value; and
identify the current scale as a second identified scale level when the identified first level of applied pressure is above the threshold value.

6. The force-scalable stationary interface control of claim 1, wherein the controller is further configured to:
identify the current scale based on the identified first level of applied pressure sensed at the touch sensor, and control the at least one output device to provide the identified current scale; and after the identified current scale is determined,
control the at least one output device to provide the identified scrolling action based on the identified current scale and the detected change of the locations of the touch input.

7. The force-scalable stationary interface control of claim 1, wherein the controller is further configured to identify the current scale based on the identified first level of applied pressure sensed during sensing of the detected change in the locations of the touch input at the touch sensor.

8. The force-scalable stationary interface control of claim 1, wherein the scrolling action includes scrolling through one or more of: items in a list stored at a memory accessible to the controller; and, channels of a radio to which the knob-like structure is attachable.

9. The force-scalable stationary interface control of claim 1, wherein the controller is further configured to control the at least one output device to provide the identified scrolling action after identifying the current scale and when the detected change in the locations of the touch input are sensed at the touch sensor.

10. The force-scalable stationary interface control of claim 1, wherein the at least one output device is located one or more of at the knob-like structure and in a radio device to which the knob-like structure is attachable, the at least one output device including one or more of: a display device, a speaker, and a haptic device.

11. A method comprising:
identifying, at a controller, a first level of applied pressure sensed at a touch sensor, the touch sensor located at least partially around a fixed surface of a knob-like structure, the knob-like structure including an axis, the fixed surface located at least partially around the axis, the fixed surface about parallel to the axis, the touch sensor configured to sense a plurality of different levels of applied pressure and locations of touch input, the controller coupled to the touch sensor and at least one output device;
identifying, at the controller, a scrolling action based on a detected change in the locations of the touch input sensed at the touch sensor;
identifying, at the controller, a current scale of the scrolling action based on an identified first level of applied pressure sensed at the touch sensor;
controlling, at the controller, the at least one output device to provide an identified current scale and an identified scrolling action; and
identifying the current scale and controlling the at least one output device to provide the identified current scale and the identified scrolling action when the first level of applied pressure is simultaneously sensed at two or more positions around the fixed surface due to two fingers squeezing the fixed surface.

12. The method of claim 11, further comprising increasing the identified current scale as a level of applied pressure, sensed at the touch sensor, increases.

13. The method of claim 11, further comprising increasing the identified current scale by one or more orders of magnitude as a level of applied pressure, sensed at the touch sensor, exceeds one or more respective threshold values.

14. The method of claim 11, further comprising:
identifying the current scale as a first identified scale level when the identified first level of applied pressure is below a threshold value; and
identifying the current scale as a second identified scale level when the identified first level of applied pressure is above the threshold value.

15. The method of claim 11, further comprising:
identifying the current scale based on the identified first level of applied pressure sensed at the touch sensor, and controlling the at least one output device to provide the identified current scale; and after the identified current scale is determined,
controlling the at least one output device to provide the identified scrolling action based on the identified current scale and the detected change of the locations of the touch input.

16. The method of claim 11, further comprising determining the current scale based on the identified first level of applied pressure sensed during sensing of the detected change in the locations of the touch input at the touch sensor.

17. The method of claim 11, wherein the scrolling action includes scrolling through one or more of: items in a list stored at a memory accessible to the controller; and, channels of a radio to which the knob-like structure is attachable.

18. The method of claim 11, further comprising controlling the at least one output device to provide the identified scrolling action after identifying the current scale and when the detected change in the locations of the touch input are sensed at the touch sensor.

* * * * *